United States Patent
Westlund et al.

(10) Patent No.: US 9,106,334 B2
(45) Date of Patent: Aug. 11, 2015

(54) METHOD AND SYSTEM FOR COMMON-MODE-REJECTION-RATIO (CMRR) CHARACTERIZATION OF AN INTEGRATED COHERENT RECEIVER

(71) Applicant: EXFO Inc., Quebec (CA)

(72) Inventors: Mathias Westlund, Lerum (SE); Henrik Sunnerud, Landvetter (SE)

(73) Assignee: EXFO Inc., Quebec (CA)

( * ) Notice: Subject to any disclaimer, the term of this patent is extended or adjusted under 35 U.S.C. 154(b) by 0 days.

(21) Appl. No.: 14/273,652

(22) Filed: May 9, 2014

(65) Prior Publication Data

US 2014/0341564 A1 Nov. 20, 2014

Related U.S. Application Data

(60) Provisional application No. 61/824,129, filed on May 16, 2013.

(51) Int. Cl.
*H04B 10/073* (2013.01)
*H04B 10/61* (2013.01)

(52) U.S. Cl.
CPC .......... *H04B 10/0731* (2013.01); *H04B 10/614* (2013.01)

(58) Field of Classification Search
CPC ...... H04B 10/07–10/0799; H04B 10/61–10/64
See application file for complete search history.

(56) References Cited

U.S. PATENT DOCUMENTS

| | | | |
|---|---|---|---|
| 8,406,621 B2 | 3/2013 | Painchaud et al. | |
| 2002/0130255 A1* | 9/2002 | Baney et al. | 250/227.19 |
| 2010/0209121 A1 | 8/2010 | Tanimura | |
| 2011/0123192 A1 | 5/2011 | Rosenthal et al. | |
| 2011/0129213 A1 | 6/2011 | Painchaud et al. | |
| 2012/0224847 A1 | 9/2012 | Ibragimov et al. | |
| 2012/0237202 A1 | 9/2012 | Abe et al. | |
| 2013/0051790 A1 | 2/2013 | Yasuda et al. | |
| 2013/0156424 A1* | 6/2013 | Youn et al. | 398/38 |

OTHER PUBLICATIONS

Unknown Author, "Agilent N4392A—Optical Modulation Analyzer—Compact, Portable, Affordate—Preliminary data Sheet", Published in USA by Agilent Technologies Inc., 19 pages (Apr. 29, 2013).

A. Feldster et al. "Optical Under-Sampling and Reconstruction of Several Bandwidth-Limited Signals", Journal of Lightwave Technology, vol. 27, No. 8, pp. 1027-1033 (Apr. 15, 2009).

(Continued)

*Primary Examiner* — David Payne
*Assistant Examiner* — Casey Kretzer
(74) *Attorney, Agent, or Firm* — Helene Chotard

(57) ABSTRACT

There are provided a method and a system for characterizing the CMRR of an ICR under test, which employ highly coherent light from two continuous-wave (CW) single-frequency lasers whose respective optical frequencies mutually differ by an offset defining an "Intermediate Frequency" ($f_{IF}$) in the rf electrical baseband. The method involves the coherent mixing of light from these two lasers in the ICR under test. A "tone" in the rf electrical baseband at frequency $f_{IF}$ is generated by the beating of light from the two single-frequency lasers as they interfere on the photodetectors of the ICR. The resulting tone at frequency $f_{IF}$ in the output electrical signals of the ICR is then detected and analyzed to characterize the CMRR of the ICR.

28 Claims, 18 Drawing Sheets

NUMERATOR:

DENOMINATOR:

(56) References Cited

OTHER PUBLICATIONS

I. Fatadin et al. "Compensation of Quadrature Imbalance in an Optical QPSK Coherent Receiver", IEEE Photonics Technology Letters, vol. 20, No. 20, pp. 1733-1735 (Oct. 15, 2008).

H. Sunnerud et al. "Characterization of Complex Optical Modulation Formats at 100 Gb/s and Beyond by Coherent Optical Sampling", Journal of Lightwave Technology, vol. 30, No. 24, pp. 3747-3759 (Dec. 15, 2012).

R. A. Marsland "Challenges in Design and Testing of Coherent Receivers", in proceedings of CLEO/QELS, ATuB1 (2010).

Unknown Authors, "Implementation Agreement for Integrated Dual Polarization Intradyne Coherent Receivers", published by the Optical Internetworking Forum, 21 pages (2010).

Y. Painchaud, "Performance of balanced detection in a coherent receiver", Optics Express, vol. 17 No. 5, pp. 3659-3672 (Mar. 2, 2009).

* cited by examiner

METHOD AND SYSTEM FOR COMMON-MODE-REJECTION-RATIO (CMRR) CHARACTERIZATION OF AN INTEGRATED COHERENT RECEIVER

CROSS-REFERENCE TO RELATED APPLICATIONS

This application claims priority under 35 USC §119(e) of U.S. provisional patent application 61/824,129 filed May 16, 2013; the specification of which is hereby incorporated by reference.

TECHNICAL FIELD

The invention relates to the field of coherent optical detection and more specifically to testing and characterizing the Common-Mode-Rejection-Ratio (CMRR) of Integrated Coherent Receivers (ICR).

BACKGROUND OF THE ART

Coherent transmission is increasingly being employed in modern fiber-optic networks, as it is a key enabler in greatly increasing both the spectral efficiency (i.e. number of data bits per Hz of optical spectrum) and the tolerance of links to various transmission impairments (e.g. polarization mode dispersion, chromatic dispersion, etc.). Usually, the spectral efficiency is increased by an additional factor of two by spectrally multiplexing orthogonally-polarized optical signals, an approach referred to as "polarization multiplexing" (Pol-Mux). A receiver suitable for use with coherent PolMux signals normally comprises high-performance electronics, high-rejection balanced optical detectors, quality polarization optics, and precision optical-interferometer arrangements, in addition to employing a highly-coherent tunable laser to serve as a local oscillator (LO).

In order to provide the economies of scale necessary for widespread adoption of coherent transmission, most commercial systems employ the basic modulation format and data bit rates recommended by the Optical Internetworking Forum (OIF). In particular the OIF has published an Implementation Agreement (OIF-DPC-RX-01.0) that specifies key performance parameters and specifications to which a commercial Integrated Coherent Receiver (ICR) should be in conformity.

Characterization of an ICR may be undertaken at different points along the supply chain, and the thoroughness of such characterization may vary accordingly. For instance, in its own development or qualification laboratories, an ICR manufacturer will likely characterize all possible parameters and specifications under many different conditions. On the other hand, during the actual fabrication/assembly process in high-volume manufacturing, the parameters will likely be measured under specified conditions (e.g. at a predetermined temperature), and full meteorological specifications provided for those specifications deemed most critical. In many cases, the manufacturer may tightly control key aspects of the fabrication process and thereby have the confidence to guarantee several ICR parameters "by design". These parameters then will be fully verified only for a small subset of the manufactured ICRs, in order to ensure quality control. Thereafter, the end customer, who intends to integrate the ICRs into its transmission equipment, will normally perform an "incoming inspection" of all or a sample of the delivered ICRs to verify one or more key parameters, in accordance with the same definitions provided in the OIF Implementation Agreement.

The sophistication, and hence cost, of the test-and-measurement instrumentation needed to undertake the above-described characterization varies significantly according to the point along the "supply chain". The high cost of versatile high-performance test equipment (e.g. high-speed real-time multi-port oscilloscopes) would generally not be critical in an R&D laboratory, since this equipment would also be used for a wide variety of high-performance measurements. On the other hand, there is a need for dedicated test & measurement equipment of lower cost to carry out ICR verification during volume manufacturing, this equipment having features specifically targeted to the measurement of the required parameters.

A key performance parameter that normally must be measured is the Common Mode Rejection Ratio (CMRR). The ICRs are based on optical intradyne coherent detection (where "intradyne" detection refers to a special case of heterodyne detection, for which the local-oscillator optical frequency falls within the spectral bandwidth of the data-carrying signal). Doubly-balanced detection of the "complementary" (i.e. exhibiting a mutual 180-degree phase difference) pair of optical signals leads to nearly complete suppression of contributions to the electrical signal originating from the "direct" optical signal power ($|E_{sig}|^2$) and/or from the "direct" LO light level ($|E_{LO}|^2$), leaving only the data-carrying contribution arising from the mixed signal and LO electric fields in the differential electrical signal. The CMRR quantifies the degree to which these direct terms are suppressed with respect to the differential electrical signal. Typically, the CMRR is dependent upon the frequency of the differential electrical signal. An ICR may exhibit a non-zero CMRR as a result of non-idealities along its optical paths, e.g. non-ideal splitting ratios (e.g. different than 3 dB) or inaccurate path differences within one of the optical interferometers. Non-zero CMRR may also arise from the different responsivities of the two "balanced" detectors (and associated front-end electronics), which often exhibit a dependence on the detected frequency response. As defined herein, the CMRR is a combined measure of both the quality of the optical paths and the detector responsivities, without explicitly isolating the relative contribution of each. In other words, unless otherwise specified, CMRR as used herein corresponds to the "optical-input-to-electrical-output" CMRR.

Painchaud et al (US 2011/0129213 A1) propose a method and apparatus for measurement of the overall CMRR for each differential output of the ICR. (It should be noted that Painchaud et al designate the term "Single Port Rejection Ratio"—SPRR—to describe the CMRR encompassing contributions of both the optical paths and the detectors responsivities.) FIG. 1 shows a schematic of this prior-art test setup suitable for such measurement on an ICR 10. A tunable laser 12 serves as a source of highly-coherent light at optical frequency $v_0$, and this light is then modulated in amplitude, by means of an intensity modulator (IM) 14 to generate two optical sidebands. These sidebands straddle the laser optical frequency $v_0$, respectively shifted to the "blue" and "red" sides therefrom by an optical frequency difference of $f_{IF}$. The frequency $f_{IF}$ is precisely selected and known from the modulation frequency generated by an rf frequency generator 16, the electrical output of which is applied to the intensity modulator 14. The rf frequency generator 16 and the intensity modulator 14 generally must have a high electrical bandwidth, typically of the order of the symbol rate, $f_{BAUD}$, at which the ICR-under-test is normally operated (e.g. approximately 30 GBaud for currently deployed PM-QPSK transmission systems), since CMRR characterization and determination of other parameters (e.g. Total Harmonic Distortion—

THD) normally requires that measurements be carried out at rf frequencies spanning the ICR electrical bandwidth. In addition to the generally expensive hardware required for generating sidebands at $f_{IF}$, the system of Painchaud et al (loc cit) also requires a slowly-varying controllable phase modulator 18 disposed in the optical path before one of the ICR inputs. Moreover, their method requires that the optical powers of the portions of test light launched simultaneously into the LO and SIG input ports be in a predetermined mutual proportionality (e.g. in a 2:1 ratio for their embodiment illustrated in FIG. 1), requiring the use of accurately calibrated attenuators 20 or other power control means.

It would thus be desirable that there be an alternative method and system to characterize the CMRR of an integrated optical receiver, in particular an "optical-input-to-electrical-output" CMRR. It is desirable that this alternative method be compatible with simpler and less expensive hardware, and, like the aforementioned prior-art approach, be compatible with the characterization of other key ICR parameters.

SUMMARY

It is an object of the present invention to provide a method and system for characterizing the Common-Mode-Rejection-Ratio (CMRR) of Integrated Coherent Receivers (ICR), which address at least one of the above-mentioned concerns.

In accordance with one embodiment, there is provided a method and a system for characterizing the CMRR of an ICR under test, which employ highly coherent light from two continuous-wave (CW) single-frequency lasers whose respective optical frequencies differ from each other by an offset which defines an "Intermediate Frequency" ($f_{IF}$) in the rf electrical baseband. The method involves the coherent mixing of light from these two lasers in the ICR under test. A "tone" in the rf electrical baseband at frequency $f_{IF}$ is generated by the beating of light from the two single-frequency lasers as they interfere on the photodetectors of the ICR. The resulting tone at frequency $f_{IF}$ in the output electrical signals of the ICR is then detected and analyzed typically as a function of the $f_{IF}$ value (which is varied by tuning at least one of the two single-frequency lasers) to characterize the CMRR of the ICR.

Employing two single-frequency lasers that are mutually slightly offset in wavelength in order to generate the intermediate frequency $f_{IF}$ at least eliminates the need for an expensive intensity modulator and rf frequency generator as employed in the above-mentioned prior art. However, in the method and system proposed herein, the exact value of the intermediate frequency is not generally known with the same high precision. Nonetheless, should the precision not be sufficient to thoroughly characterize the CMRR, it is proposed herein to overcome this issue by retrieving the value of the intermediate frequency from the output electrical signals of the ICR as detected and sampled.

Further, in some embodiments, detection of the electrical output of the ICR under test is made using undersampling which, again, helps in reducing the overall cost of the test hardware by eliminating the need for a high-bandwidth multi-channel oscilloscope, which would be required for real-time (Nyquist) sampling of common ICRs designed for operation with optical communication signals having a symbol rate of 28 GBaud or even more.

In accordance with one aspect, there is provided a method for characterizing a parameter of an Integrated Coherent Receiver (ICR) being designed for normal use to receive a phase-modulated optical communication signal transmitted at a specified symbol rate $f_{BAUD}$, and comprising:
  two optical input ports,
  an optical hybrid arrangement for heterodyne mixing of signals to be received at the two optical input ports, at a pair of complementary optical outputs, and
  a pair of balanced photodetectors to detect light exiting corresponding said pair of complementary optical outputs, to provide a differential electrical signal at an electrical output,
The method comprises the steps of:
  providing a first polarized highly-coherent optical test signal at optical frequency $v_1$ and a second polarized highly-coherent optical test signal at optical frequency $v_2$ for injection into the ICR, said first and second test signals having respective optical frequencies mutually spaced by an intermediate frequency $f_{IF}=v_2-v_1$;
  injecting the first test signal into one of the two optical input ports of the ICR and the second test signal into the other of the two optical input ports, and sampling the electrical output of the ICR at a known primary sampling rate $f_s$ to provide a denominator value, the electrical output being responsive to heterodyne mixing of said first and second optical test signals;
  injecting co-propagating said first and second test signals into a given one of the two optical input ports, and sampling the electrical output of the ICR at said primary sampling rate fs to provide a numerator value corresponding to said given one of the two optical input ports, the electrical output being responsive to heterodyne mixing of said first and second optical test signals; and
  calculating a value of said parameter from said numerator and denominator values.

In accordance with another aspect, there is provided a test system for characterizing a parameter of an Integrated Coherent Receiver (ICR) being designed for normal use to receive a phase-modulated optical communication signal transmitted at a specified symbol rate $f_{BAUD}$, and comprising:
  two optical input ports,
  an optical hybrid arrangement for heterodyne mixing of signals to be received at the two optical input ports, at a pair of complementary optical outputs, and
  a pair of balanced photodetectors to detect light at corresponding said pair of complementary optical outputs, to provide a differential electrical signal at an electrical output,
The system comprises:
  two optical output ports for connection respectively to said two optical input ports of said ICR;
  a first polarized highly-coherent optical source for providing a first test signal at optical frequency $v_1$ and a second polarized highly-coherent optical source for providing a test signal at optical frequency $v_2$, said first and second test signals respective optical frequencies mutually spaced by an intermediate frequency $f_{IF}=v_2-v_1$;
  an optical switching arrangement for switching said first and second test signals into at least a first and a second test configuration wherein:
    in said first test configuration, the first and the second test signals are directed to respective said two optical output ports such that the first test signal is to be injected into one of the two optical input ports of the ICR and the second test signal into the other of the two optical input ports; and
    in said second test configuration, the first and the second test signals are combined and directed to a given one of the two optical output ports to be together injected in co-propagation into a corresponding one of the two optical input ports;

an analog-to-digital converter for sampling the electrical output of the ICR at a known primary sampling rate $f_s$, the electrical output being responsive to heterodyne mixing of said first and second optical test signals, wherein:

sampling the electrical output in said first test configuration is to provide a denominator value, and sampling the electrical output in said second test configuration is to provide a numerator value corresponding to said given one of the two optical input ports; and a signal processor configured for calculating a value of said parameter from the numerator value and the denominator value.

DETAILED DESCRIPTION

Figure 1:
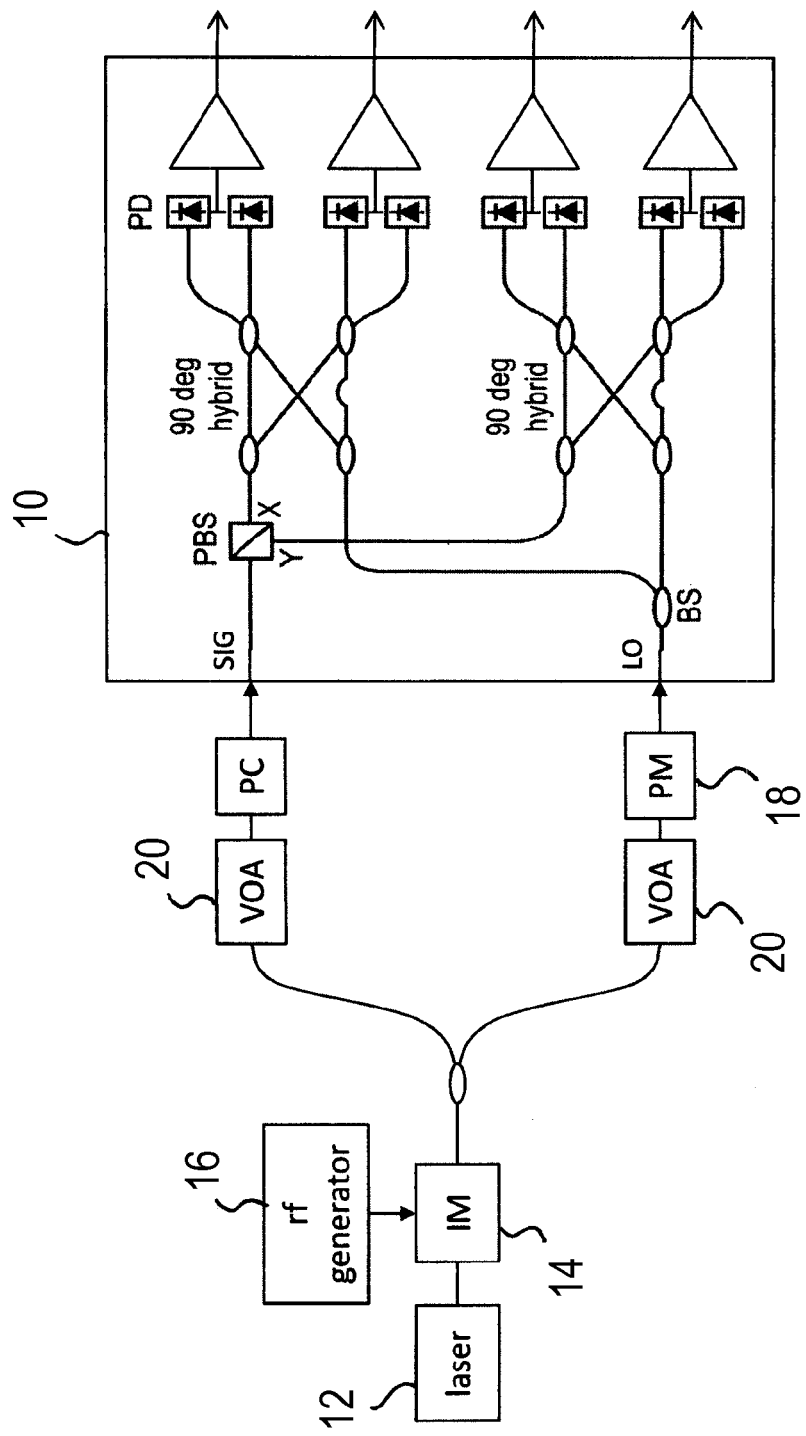
FIG. 1 (Prior art) is a block diagram illustrating a prior-art test setup suitable for measuring the Common-Mode-Rejection-Ratio (CMRR) for each differential output of an ICR under test.
Figure 2:
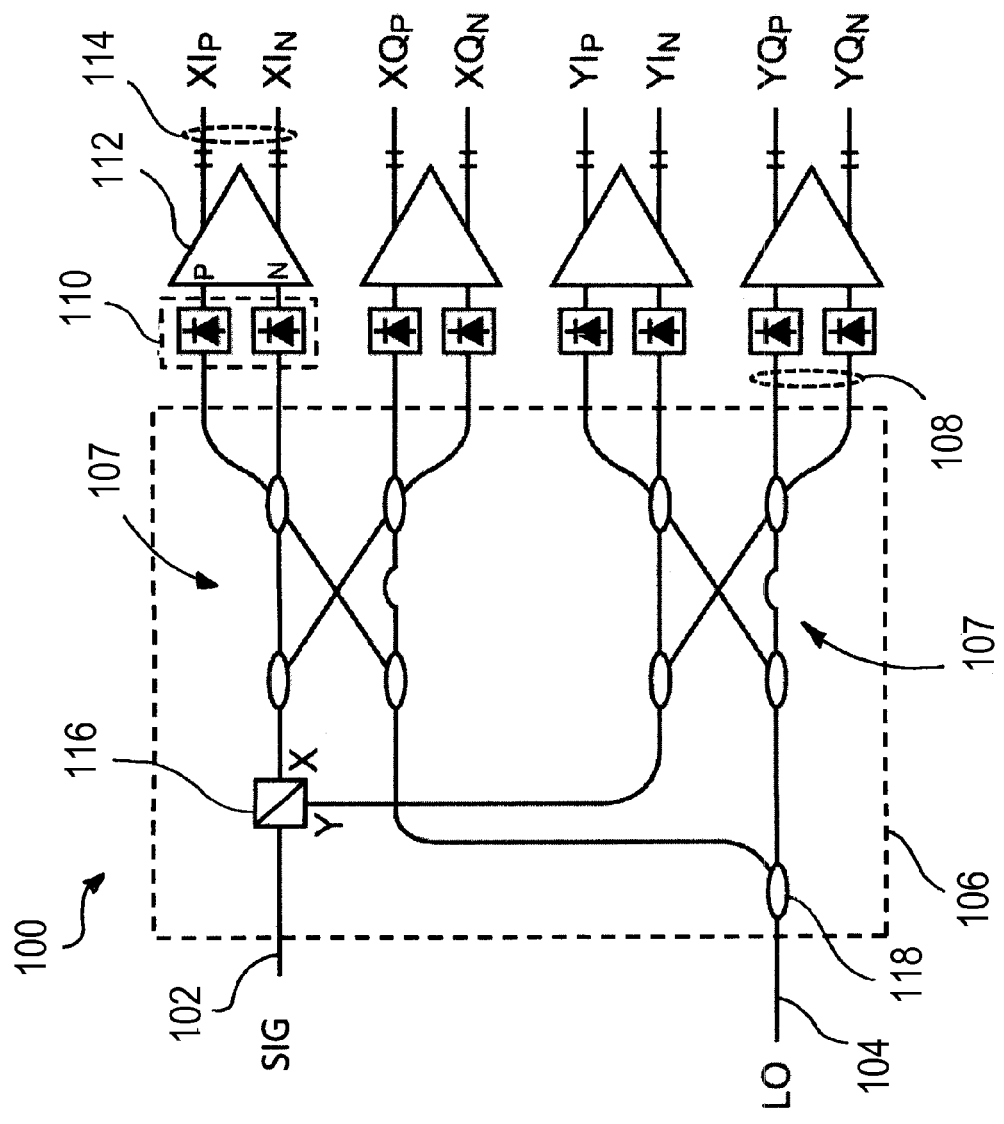
FIG. 2 is a block diagram illustrating the main components of a typical Integrated Coherent Receiver (ICR) in accordance with the Optical Internetworking Forum (OIF) Implementation Agreement.

Now referring to the drawings, FIG. 2 depicts schematically the principal elements of a typical Integrated Coherent Receiver (ICR) 100 designed for normal use to receive a phase-modulated optical communication signal. The ICR 100 comprises:

i. Two optical input ports, namely a signal (SIG) input port 102 and a Local Oscillator (LO) input port 104;

ii. A 90-degree optical hybrid arrangement 106 comprising two optical mixers 107, each having two pairs of complementary outputs 108, for mixing of signals to be received at input ports 102 and 104 thereto;

iii. Four pairs of balanced photodetectors 110 to detect light in corresponding pairs of complementary optical outputs 108;

iv. Four differential amplifiers 112 with differential electrical outputs 114, to amplify the detected complementary optical outputs 108;

v. A Polarization Beam Splitter (PBS) 116 in the optical hybrid arrangement 106, separating the optical signal at the signal input port 102 into two orthogonally-decomposed polarization-analyzed portions, each portion being delivered to one of the optical mixers 107;

vi. A polarization-maintaining power splitter or polarization-splitting element 118 (also referred to herein as a beam splitter or BS) optical hybrid arrangement 106, splitting the local oscillator at input port 104 with equal power to the two optical mixers 107.

The generic ICR, as specified by the OIF Implementation Agreement (loc cit), is a key subsystem of a 100 G PM-QPSK receiver, and comprises at least the first four components listed above. More commonly, contemporary ICRs also include the last two components as well. Note that the electrical outputs denoted by subscripts "P" and "N" are complementary differential outputs, i.e. of opposite sign.

The detailed description hereinbelow will assume that the ICR comprises these six components. The method can be extended or modified to include other ICR designs which may have different components, as will be mentioned hereinbelow.

The coherent mixing in the ICR of the optical communication signal (SIG) and the local oscillator (LO) necessary for heterodyne detection of the optical communication signal takes place in a polarization-diverse structure comprising the two optical mixers 107. Many potential imperfections may be distributed along the multiple optical paths created by the polarization beam splitter (PBS) 116, beam splitter (BS) 118 and optical mixers 107, as well as in the balanced-detection means. In particular, the overall (i.e. from optical input to electrical output) Common-Mode-Rejection-Ratio (CMRR) of the ICR may be adversely affected by one or more of many possible imperfections, comprising, for example, deviations from 90 degrees of one or both of the optical mixers in the 90-degree optical-hybrid arrangement, non-ideal coupling ratios in the splitters and combiners, optical reflections, asymmetric optical loss along paths in the optical hybrids, skew (i.e. relative time delays) between the I and Q tributaries corresponding to one polarization, unbalanced responsivity of the "balanced" photodetector pairs, and electrical CMRR due to the high-speed differential amplifiers 112. Another important parameter of interest is the Total Harmonic Distortion (THD), which quantifies the extent to which the electrical output from a trans-impedance amplifier (TIA) 112 deviates from ideal linearity, and will be discussed in more detail hereinbelow.

Common Mode Rejection Ratio (CMRR)

A non-ideal CMRR (>0, in linear units) may originate from one or more of: (a) unequal (i.e. unbalanced) internal losses in the hybrid; (b) differential detector responsivities; and, (c) for high frequencies, skew introduced by non-equal P and N paths before the TIA. To measure the CMRR at DC, in principle it is only necessary to measure the DC currents of each balanced photodetector pair and calculate (in dB units)

$$CMRR_{DC} = 20\log_{10}\left(\frac{|I_P - I_N|}{I_P + I_N}\right). \quad \text{Eq. (1a)}$$

However, the CMRR is usually a function of rf frequency, and may be further impaired at higher frequencies due to P-N skew before the differential amplifier 112. In embodiments of the present invention, the rf frequency corresponds to the Intermediate Frequency $f_{IF}$, which may be expressed in terms of the respective optical frequencies, $v_1, v_2$, of the single-frequency light emitted by the lasers, as:

$$f_{IF} = v_1 - v_2 \quad \text{Eq. (2)}.$$

Note that $f_{IF}$ is, in general, a signed value, i.e. it may take on negative values. The frequency-dependent CMRR (in dB units) may then be expressed as:

$$CMRR(f) = 20\log_{10}\left(\frac{|I_P(f) - I_N(f)|}{I_P(f) + I_N(f)}\right). \quad \text{Eq. (1b)}$$

Figure 3A:
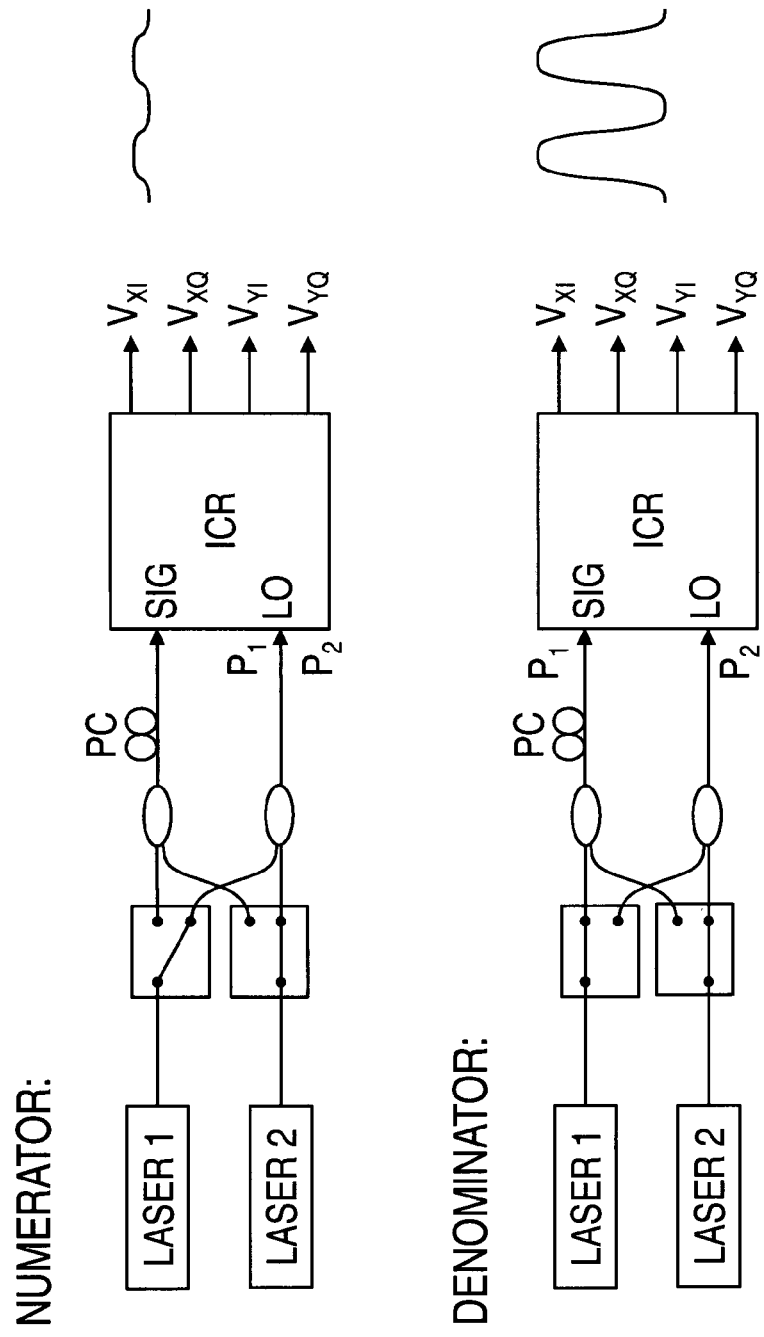
FIG. 3A is a schematic illustrating a method for measuring the CMMR as applied to the local oscillator (LO) input port of an ICR.
Figure 3B:
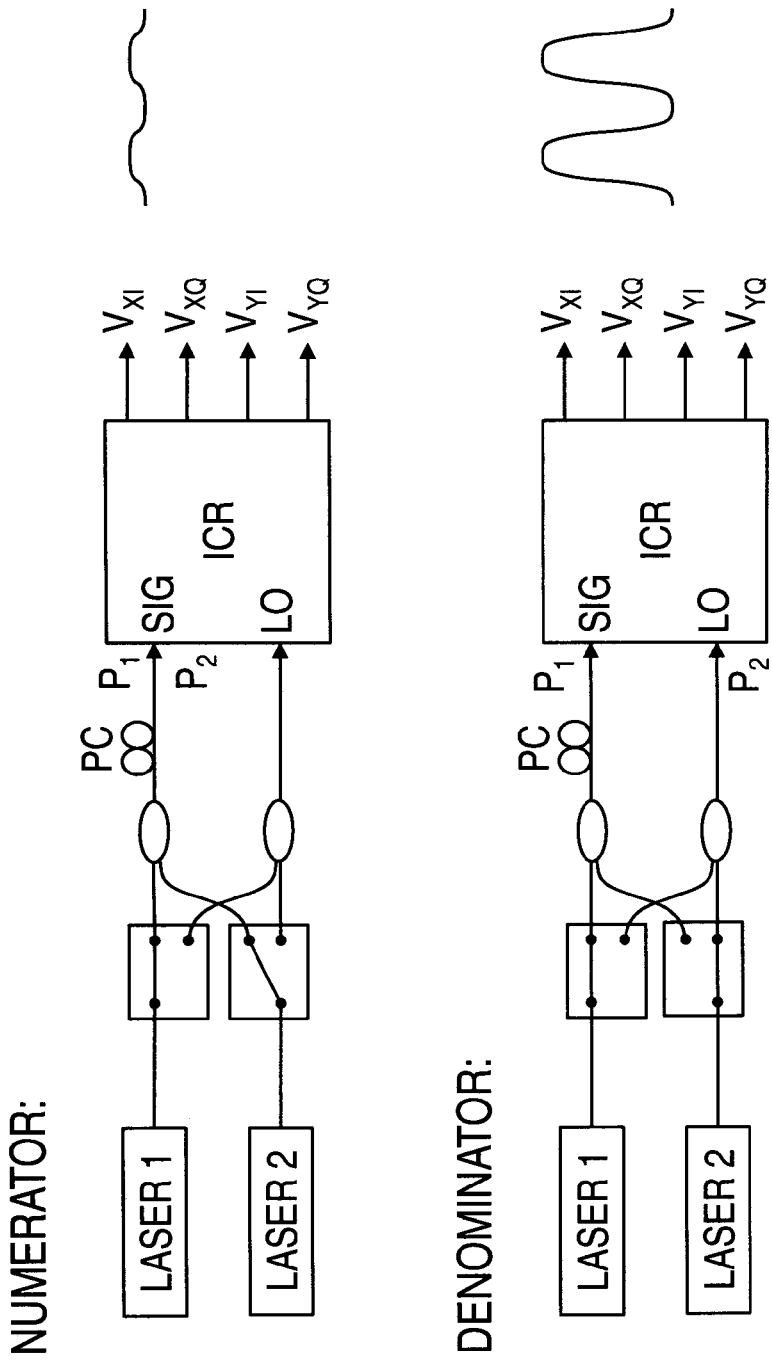
FIG. 3B is a schematic illustrating the method of FIG. 3A as applied to the signal (SIG) input port of an ICR.

In one embodiment, the frequency-dependent CMRR may be determined using a setup depicted conceptually in FIGS. 3A and 3B. FIG. 3A depicts a setup for measuring $CMRR_{LO}$, whereas FIG. 3B depicts the corresponding setup for measurement of $CMRR_{SIG}$. Here, the first test laser ("laser 1") serves as the source of the notional "signal" of power $P_1$ ("notional", since it emits single-frequency light for injection into the ICR under test), and the second test laser ("laser 2") serves as the source of single-frequency "local oscillator" light of power $P_2$.

Referring now to the case of $CMRR_{LO}$ shown in FIG. 3A, the numerator in Eq. 1a and 1b may be determined by simultaneously injecting into the LO port the single-frequency light emitted respectively from both test lasers and measuring the amplitude of the weak differential signal (that ideally should be zero, if CMRR=0) for each corresponding output. To measure the denominator in Eq. 1a and 1b, light from the first laser ($P_1$) is injected instead into the signal port (which corresponds to normal operation). In one approach, the response is maximized for X and Y polarizations separately (e.g. via a polarization controller PC) and the corresponding amplitudes of the X and Y output ports are measured sequentially, whereas in another approach, the responses are set to be approximately equal, and the X and Y amplitudes are measured concurrently. Depending on which of the aforementioned approaches is chosen, an appropriate proportionality factor may have to be applied in order that the measurement corresponds to the correct CMRR value. For instance, in the first approach, the denominator of the logarithmic argument in Eq. 1a and 1b needs to be multiplied by a factor of $\sqrt{2}$.

Figure 4:
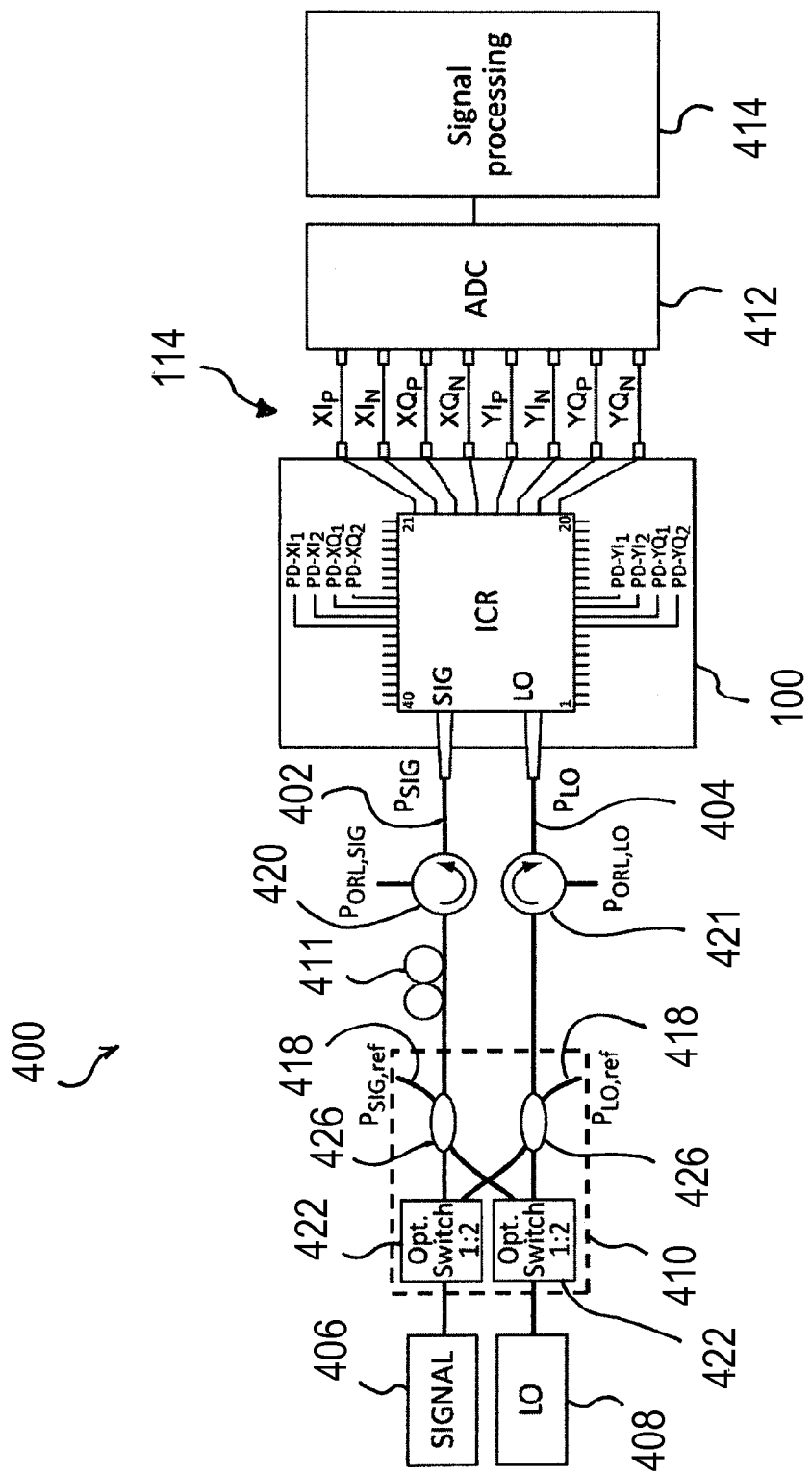
FIG. 4 is a block diagram illustrating the main components of a test system for characterizing parameters of an ICR under test, including CMRR characterization according to the method of FIGS. 3A and 3B, in accordance with one embodiment (the ICR under test being also included on the figure)

FIG. 4 shows the main components of one embodiment of a test system 400 for characterizing parameters of an ICR under test 100 (also included on the figure), including CMRR characterization according to the method of FIGS. 3A and 3B. The test system 400 comprises two optical output ports 402, 404 for connection respectively to the two optical input ports of the ICR; a first ("SIG") polarized highly-coherent optical source 406 (laser) for providing a first test signal at optical frequency v1 and a second ("LO") polarized highly-coherent optical source 408 for providing a test signal at optical frequency v2; an optical switching arrangement 410 for directing the first and second test signals into different test configurations corresponding to FIGS. 3A and 3B; and a polarization controller (PC) 411 for adjusting the State Of Polarization (SOP) of the polarized optical test signals $P_{SIG}$, $P_{LO}$ with respect to the optical input ports 102, 104 of the ICR. The test system further includes a sampling arrangement 412 comprising an analog-to-digital converter (ADC) for sampling the electrical outputs 114 of the ICR and a signal processor 414 configured for calculating parameters characterizing the CMRR of the ICR.

This and other embodiments of the method of FIGS. 3A and 3B involve the coherent mixing and detection in the ICR of light from the two lasers 406, 408 and subsequent signal processing and analysis of the resulting detected "tone" in the differential electrical signals 114 (normally eight output signals, as shown in the embodiment of FIG. 4) as a function of intermediate frequency $f_{IF}$. The tone in the rf electrical baseband at frequency $f_{IF}$ is a beat frequency created by the interference of the light from these two highly-coherent lasers impinging upon the active surfaces of the photodetectors 110. It is emphasized that there is no requirement that the light emitted by either of the two lasers 406, 408 be modulated (e.g. to create optical sidebands) and no modulation need be imparted to the light as it propagates within the ICR under test 100. This is in contrast to the prior-art approach of Painchaud et al (loc cit), who first amplitude modulate the light emitted from a (single) laser at frequency $f_{IF}$ to generate optical sidebands on the light itself, which subsequently, at the photodetectors, generates the electrical tone at $f_{IF}$. It should be noted that the setup of FIG. 4 includes additional optional elements (e.g. reference monitor ports 418, optical circulators 420 421, etc.) that may be exploited to measure other OIF-specified ICR parameters, as will be briefly described hereinbelow.

The optical frequency of the light of either, but preferably both, of the first (SIG) and second (LO) test lasers 406, 408 may be turnably set in small steps within a prescribed spectral interval about any chosen center wavelength, this interval being approximately ±30 GHz for an ICR designed for 100 G PM-QPSK. Typically, the chosen wavelengths correspond to the ITU grid of interest (normally the telecom C-band or L-band).

The optical switching arrangement 410 comprises optical switches 422 followed by optical couplers 424, 426, to enable light from the first (SIG) and second (LO) lasers to be injected into their respective ICR input ports, or to be combined and injected simultaneously into one of either the SIG or LO input ports of the ICR, in conformity with the configurations of FIG. 3A and FIG. 3B, for evaluation of the corresponding $CMRR_{LO}$ and $CMRR_{SIG}$ values.

The optical path between the LO laser 408 and the LO output port 404 (connected to the LO input port 104 of the ICR) is entirely comprised of Polarization-Maintaining (PM) fiber, thereby guaranteeing alignment of the SOP of light from the second laser 408 with respect to the PM fiber of the LO input port 104 of the ICR 100. The first portions of the signal path, between the first laser 406 and the outputs of the two couplers 424, 426, also comprise PM fibers, in order to ensure that the SOPs of the SIG and LO light will be the same as they co-propragate. Following the optical coupler 424 on the "SIG" path, standard (i.e. non-PM) singlemode fiber and (optional) circulator 420 are used, since signal input port 102 of the ICR 100 employs standard fiber. The polarization controller (PC) 411, disposed in the signal path, provides means for adjusting the splitting ratio of the signal power in the X and Y polarization branches of the ICR.

The circulators 420, 421 are included in the optical paths to enable optional measurement of reflected optical power from the ICR and additional OIF-recommended performance parameters that are not directly related to CMRR characterization.

Figure 17:
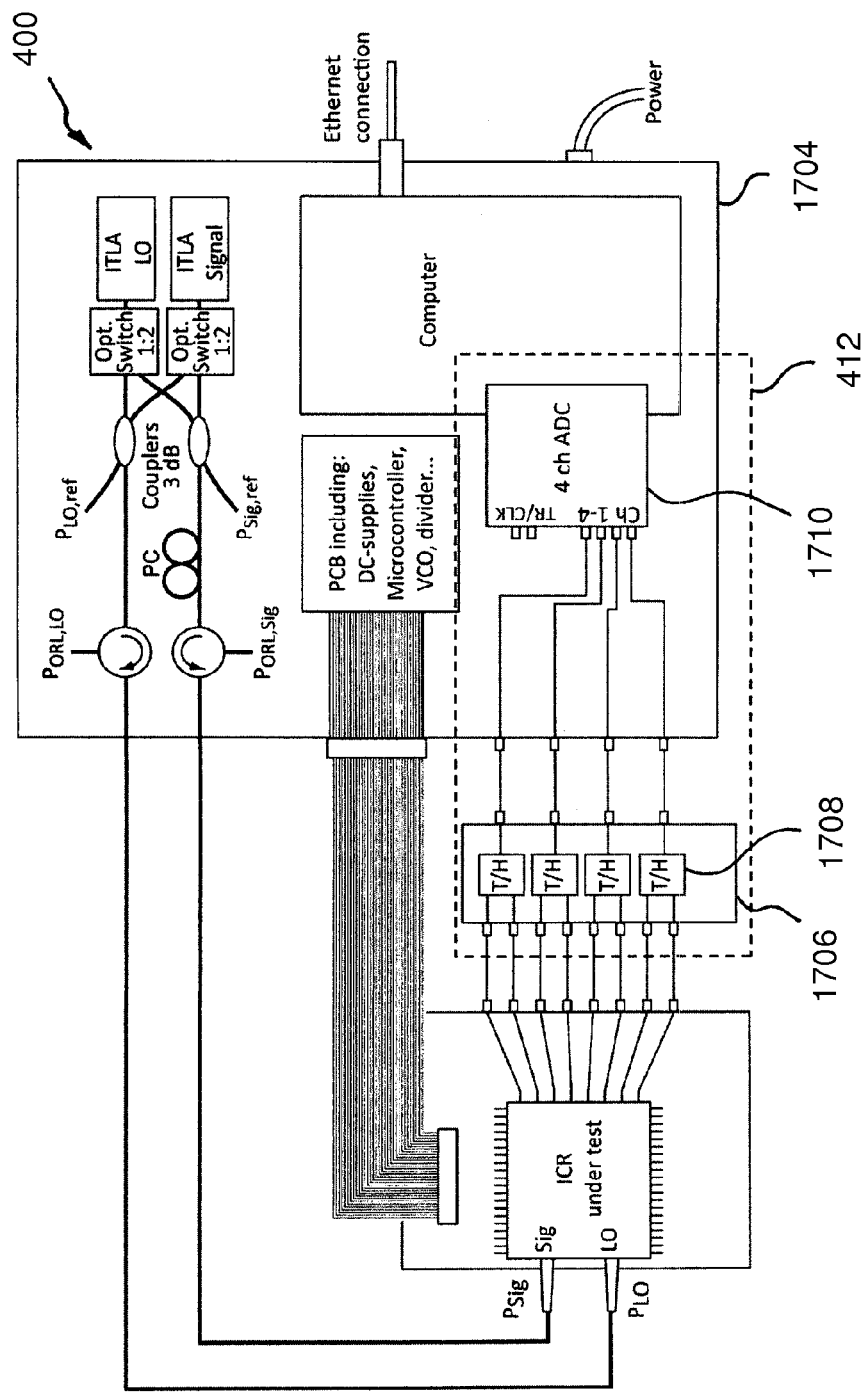
FIG. 17 is a block diagram illustrating a specific implementation of the test system of FIG. 4 (the ICR under test being also included in the figure).

FIG. 17 shows in more detail a hardware implementation of the test system 400 of FIG. 4. In this embodiment, the ICR is mounted on a PCB test fixture 1702 suitable for providing the necessary DC supply voltages in accordance with the OIF Implementation Agreement. The test system 400 is implemented in two separate parts, i.e. a main test unit 1704, and a sampling head 1706. The sampling head 1706 includes track-and-hold ("T/H") sampling circuitry 1708, which, together with the analog-to-digital converter (ADC) 1710 and enjoining electrical cables, is functionally comprised within the sampling arrangement 412. For real-time sampling, the analog bandwidth ($f_{ADC}$) of the ADC 1710 should be appropriate for the symbol rate $f_{BAUD}$ for which the ICR was designed, i.e. have significant response up to 25-30 GHz for OIF-compatible 100 G PM-QPSK signals. However, if undersampling is employed, as will be discussed further hereinbelow, the ADC 1710 may employ a sampling rate significantly less than that required for real-time sampling, and hence the cabling between the sampling head 1706 and the main test unit 1704 may be quite long. Nevertheless, in order to achieve the necessary analog bandwidth, the sampling head 1706 (comprising the T/H samplers) is placed close to the ICR test fixture 1702 in order to minimize the length of the high-bandwidth electrical connections between them.

Use of a real-time ADC simplifies the signal processing associated with ICR characterization, but significantly increases the cost of the system. Hence, in accordance with some embodiments to be described in more detail hereinbelow, undersampling is employed, in conjunction with appropriate signal processing to unambiguously identify the true rf frequency of detected aliased tones.

The PCB test fixture 1702 should include a high-bandwidth rf output interface suitable for characterization up to e.g. 25-30 GHz. If absolute detector responsivities are to be measured, the PCB 1702 should provide access to the eight individual photodetector currents (PD-$XI_1$, ..., PD-$YQ_2$). For certain other measurements described hereinbelow, it is also desirable if the external bias voltage applied to particular photodiodes within the ICR can be selectively set to zero.

However, it should be appreciated that, for CMRR analysis of the eight combinations of distinct CMRR parameters (SIG-XI; SIG-XQ; SIG-YI; SIG-YQ; LO-XI; LO-XQ; LO-YI; LO-YQ), it is not necessary to measure the photodiode currents from both the P and N outputs of each of the four differential outputs (XI; XQ; YI; YQ). The analysis of the high-bandwidth outputs can either be performed in single-ended mode on either of the P or N outputs, instead of differentially on the P-N pairs e.g. $XI_P$ and $XI_N$. However, differential coupling provides an enhanced (normally doubled) peak-to-peak voltage "swing", whereas single-ended operation permits use of an ADC arrangement having single-ended inputs, and, moreover, reduces rf cabling requirements. However, access to the eight individual photodetector currents (PD-$XI_1$, ..., PD-$YQ_2$) is required if absolute detector responsivities are also to be measured with the test setup.

In some embodiments, in addition to determination of the CMRR values defined by Eqs. (1a) and (1b), the measurement approach may be extended to provide information as to the cause or causes of non-ideal CMRR. Sources of such non-ideal behavior may comprise:

i. Deviation ($\Delta\theta_{hyb}$) from 90 degrees of the optical hybrid, leading to imperfect phase diversity (e.g. contamination of the "I" output with "Q" light, and vice versa);

ii. P-N skew ($\Delta t$) arising from slightly different electrical path lengths between each photodetector of each balanced pair and the respective input on the differential amplifier 112;

iii. I-Q skew ($t_{skew}$) corresponding to the relative time delay experienced by the "I" and "Q" components of signal;

iv. Non-equal voltage swing for the "I" and "Q" outputs.

For instance, the sampled mixing products of two lasers 406, 408, yield elliptical IQ plots (i.e. a plot of a multiplicity of sampled quadrature-phase versus in-phase signals) for each of X and Y polarizations. In an ideal ICR, the combination of 90-degree phase shifts in the hybrid and a non-zero IF leads to circular IQ plots. Hence, the signal sampled on the XI port will be sinusoidal with frequency $f_{IF}$. The output on XQ will also be a sinusoidal signal but ideally with a 90-degree phase shift. As a result, the measured IQ plot will be constituted of samples falling on a circle with an angular rotation speed of $f_{IF}$. More generally, the quadrature signals pairs X-IQ and Y-IQ can be expressed as an elliptical complex field $E_{IQ}$:

$$E_{IQ}(t) = I + iQ = \frac{V_I}{2}\cos(2\pi f_{IF} t) + i\frac{V_Q}{2}\sin(2\pi f_{IF}(t - t_{skew}) - \Delta\theta_{hyb}), \quad (3)$$

where $V_I$ and $V_Q$ are the respective peak-to-peak (differential) voltage swings of the I and Q ports, $t_{skew}$ is the channel skew between the combined I and Q port, and $\Delta\theta_{hyb}$-skew represent the error (i.e. deviation) with respect to the nominal phase shift of the optical hybrid (i.e. 90 degrees for the optical hybrid specified in the OIF Implementation Agreement.).

Furthermore, for an ideal ICR, the measured voltage swing for the different outputs (e.g. $V_I$ and $V_Q$) would be equal and independent of the IF value, again yielding circular IQ plots.

Figure 5B:
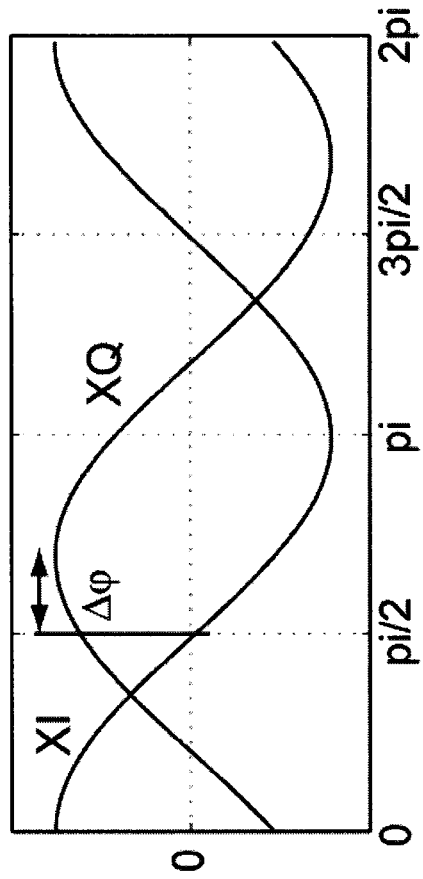
FIG. 5B is a graph showing the simulations results of FIG. 5A as a phase offset ($\Delta\phi$) between the XI and XQ ports.
Figure 5A:
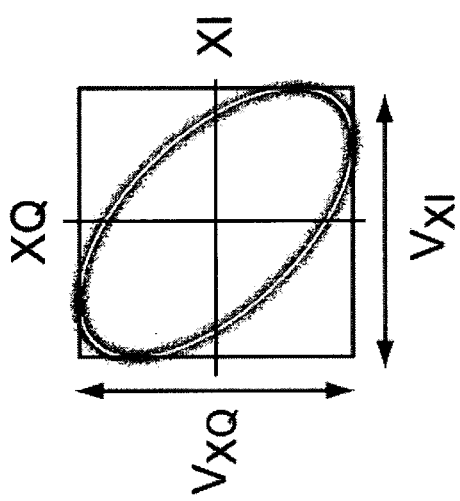
FIG. 5A is a graph showing simulation results of an elliptical IQ-plot due to skew between the XI and the XQ ports.

For an actual ICR, the performance normally deviates at least slightly from the ideal for each parameter in the OIF Implementation Agreement. Several of the parameters can be deduced conveniently by mathematically analyzing the shape of the IQ-ellipses, i.e. plotting the measured quadrature-phase versus in-phase signals corresponding to samples taken at a multiplicity of times. The individual samples may be distributed in time according to their respective modulo values ($\mod(1/f_{IF})$) in the unit interval from 0 to $1/f_{IF}$, and this interval then can be renormalized (mapped) onto the phase interval 0 to $2\pi$ (see FIGS. 5A, 5B). The ellipse can also be expressed as follows:

$$I = \frac{V_I}{2}\cos(2\pi k) \qquad (4)$$
$$Q = \frac{V_Q}{2}\sin(2\pi k - \Delta\varphi),$$

where $0<k<1$, and $\Delta\varphi$ is the phase offset from the ideal 90 degrees. In a preferred implementation, the elliptical shape (FIG. 5A) is determined as a best (e.g. least-squares) fit relative to the measured I and Q sample pairs. Expressing the ellipse in accordance with the above equation enables its decomposition into parameters $V_I$, $V_Q$ and $\Delta\varphi$.

It should be noted that the decomposition procedure is independent of both the value $f_{IF}$ and the ADC sampling rate.

Figure 6:
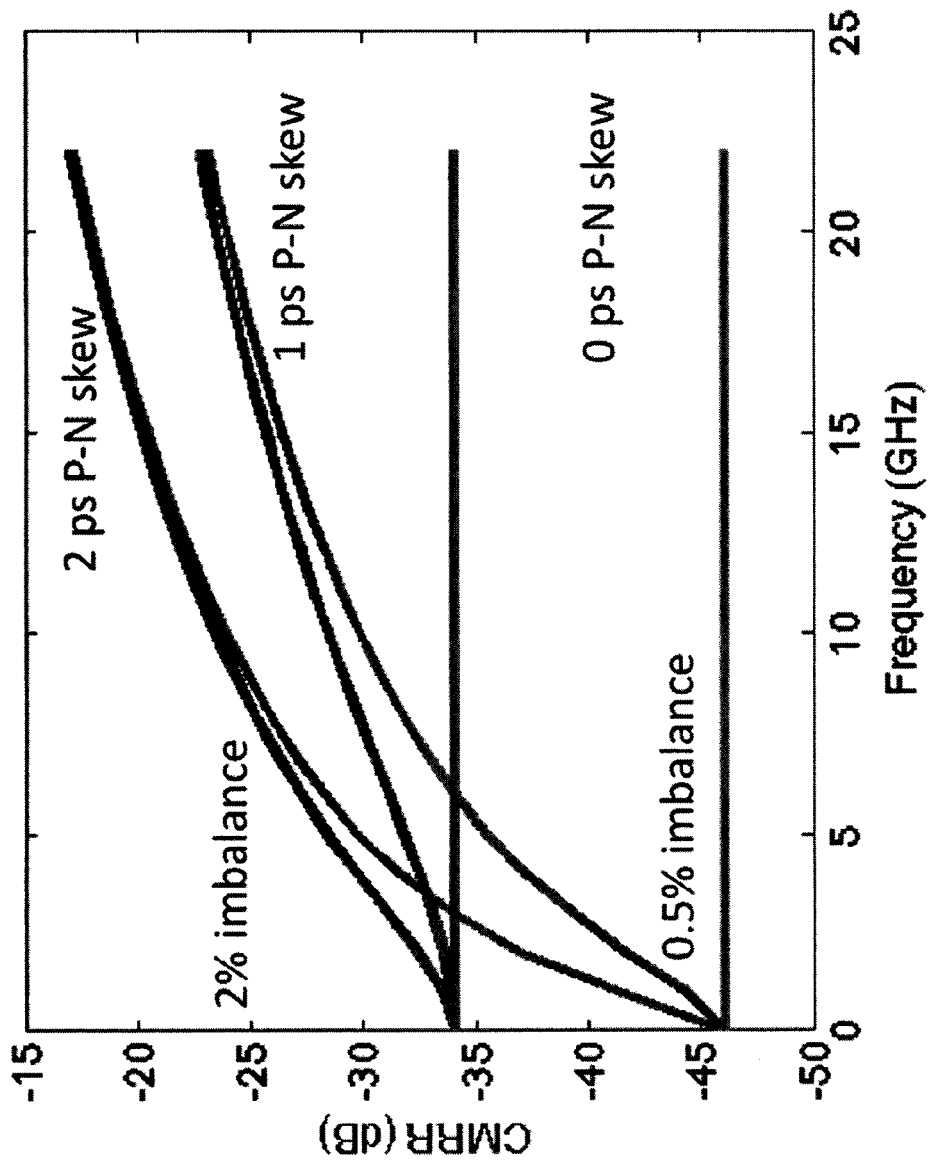
FIG. 6 is a graph illustrating numerically simulated CMRR measurements as a function of the intermediate frequency in accordance with the method of FIGS. 3A and 3B (i) as compared with (ii) the CMRR definition; (iii) the method of Painchaud et al. (loc cit) and (iv) theoretical curves, for each of two different hybrid/detector imbalances (0.5% and 2%) and three different P-N skew values (0, 1 and 2 ps), the four sets of curves (i, ii, iii, iv) being superposed on top of one another.
Figure 7A:
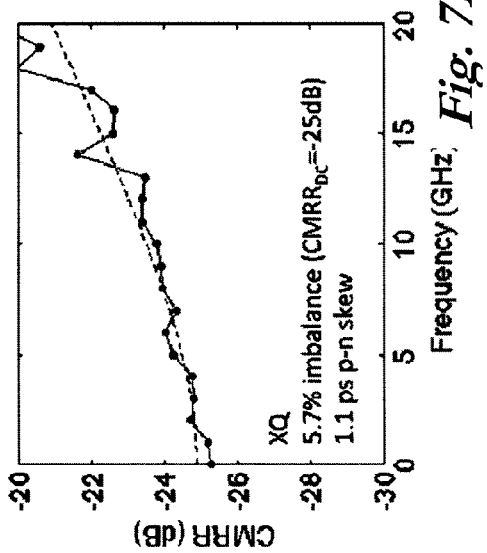
FIG. 7 comprises FIGS. 7A, 7B, 7C and 7D which are graphs showing CMRR experimental measurement results as performed on an ICR, respectively for the XI, XQ, YI and YQ output ports, wherein the solid-dot-lines represent the actual measurements and the dashed lines represent curve fits with theoretical curves.
Figure 7C:
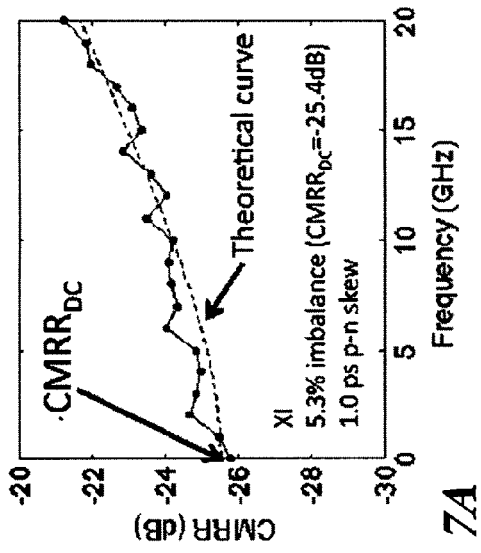
Figure 7B:
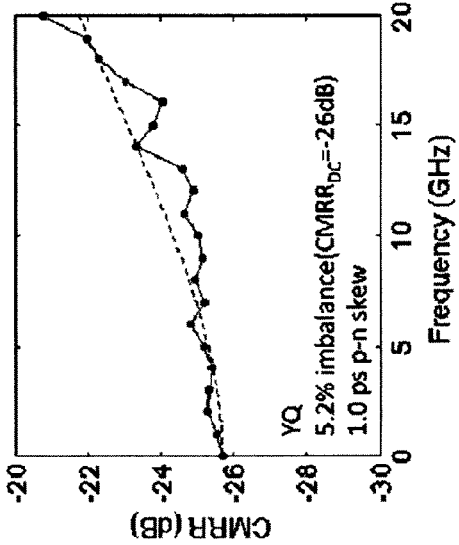
Figure 7D:
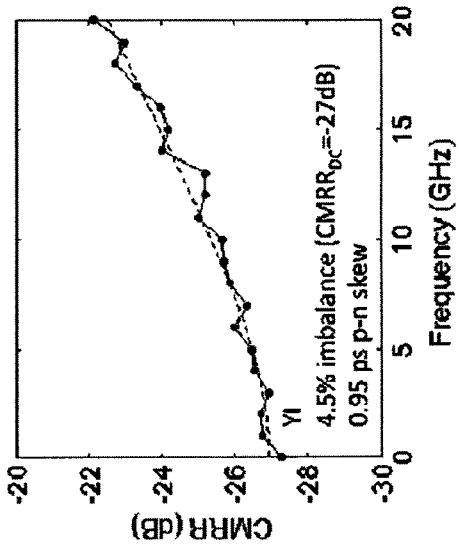

Numerical simulations have been undertaken to confirm that the embodiments described herein provide CMRR values in agreement with those obtained using the method presented in Painchaud et al (loc cit). As well, there is also good agreement with the theoretical expression presented in Painchaud et al (loc cit), which can be cast in slightly simplified form as $$\text{CMRR (dB)} \approx 10\log_{10}(\delta^2 + \tfrac{1}{2}(1-\delta^2)(1-\cos(2\pi f_{IF}\Delta t)) \qquad (5)$$

where $\delta$ is the hybrid/detector imbalance, $\Delta t$ is the P-N skew, and $f_{IF}$ is the IF. For instance, if the imbalance is 2%, the relative power splitting is 51% and 49% between two detectors either due to imbalance in detector responsivity or coupler imbalance in the hybrid. FIG. 6 shows numerically simulated CMRR measurements according to the method described hereinabove (i), which is compared with (ii) the CMRR definition; (iii) the method of Painchaud et al. (loc cit) and (iv) theoretical curves, for two different optical-hybrid/detector imbalances (0.5%, 2%), and three different P-N skew values (0-ps, 1-ps, 2-ps skew). For each of the four sets of results, the resultant curves are superposed on each other (and hence not mutually distinguishable in FIG. 6), indicating that the method of the present invention corresponds well to the definition of CMRR.

Exemplary measurements on an actual ICR are presented FIG. 7. FIGS. 7A, 7B, 7C and 7D correspond respectively to the XI, XQ, YI and YQ output ports of the ICR. The solid-dot-lines represent the actual measurements and the dashed lines represent curve fits with theoretical curves. From the slope of the curves one can estimate the P-N skews before the differential amplifiers on each port from the curve fit with the theoretical curves. The estimated P-N skew $\Delta t$ is approximately 1 ps.

Exemplary measurements on an actual ICR are presented FIG. 7. FIGS. 7A, 7B, 7C and 7D correspond respectively to the XI, XQ, YI and YQ output ports of the ICR. The solid-dot-lines represent the actual measurements and the dashed lines represent curve fits with theoretical curves. By fitting the slope of the measured curves with the theoretical curve (e.g. derived from Eq. (5)), one can estimate the P-N skew $\Delta t$ before the differential amplifier corresponding to each electrical port. The estimated P-N skew is approximately 1 ps.

Note that P-N skew before the TIA will directly affect the CMRR, whereas a P-N skew after the TIA affects both the numerator and denominator equally, and therefore not the CMRR. On the other hand, any P-N skew after the TIA (and before the ADC) will decrease the bandwidth of the measurement system.

It should further be appreciated that the method presented is applicable to both real-time sampling (i.e. respecting the Nyquist criterion) and undersampling.

Note that, in accordance with the OIF recommendation, one should measure $\text{CMRR}_{LO}$ and $\text{CMRR}_{SIG}$ at DC and at 22 GHz. CMRR at DC can be retrieved by extrapolating the CMRR(f) curve to f=0, or by measuring the currents (responsivities) with a single laser signal launched into either the LO or SIG ports for measurement of $\text{CMRR}_{LO}$ and $\text{CMRR}_{SIG}$, respectively.

The P-N skews ($\Delta t$) inside the hybrid, from the last coupler via the detectors to just before the TIA will affect the CMRR as described above. Hence, this P-N skew can be estimated from the CMRR(f) measurements via a comparison with a theoretical curve (e.g. Eq. (5)).

Alternatively, this measurement may be carried out more directly by turning off the detector bias to one detector of the detector pair and then measuring I-Q skew in a similar way as described above, followed by a comparison with results with the other detector turned off. In this way, two phase curves as a function of frequency are generated, and the difference in slope between these two curves is indicative of the P-N skew. When turning off the detector bias, the bandwidth of the detector will be reduced considerably (generally to a few hundreds of MHz), so it is preferable to choose an IF significantly above this bandwidth to minimize its influence on the measurement. For example, the skew can for be measured from two phase curves both measured for IF values falling within the intervals −10 GHz to −5 GHz, and +5 GHz to +10 GHz; the interval between −5 GHz and +5 GHz is avoided since for those frequencies the switched-off detector might still influence the measurement.

Any P-N skew introduced after the electrical output contacts of the ICR (including the electrical connections to the measurement head and internal electronics of the sampling arrangement) will result in bandwidth degradation. Although in principle this degradation could be largely taken into account via calibration, it is preferable to substantially minimize any such skew, e.g. by matching the time delays of the "P" and "N" cables comprising each cable pair to within a few picoseconds. An alternative is to perform the measurement in "single-ended mode", i.e. with just one of the balanced outputs, but this would halve the voltage swing and might render the measurement susceptible to any offsets, etc. in the TIA output.

It should be noted that, CMRR measurements, as described by embodiments herein, of course may be undertaken within more than one ITU channel, i.e. for multiple nominal channel central wavelengths falling within the specifications of the ICR under test.

It is envisaged that embodiments of this invention would be applicable for a modified ICR design for which the local oscillator laser is packaged within the housing of the ICR itself, i.e. for which there would only be one optical input port (for the SIG) through the external ICR housing. This LO laser could still be tuned via suitable electrical control signals. Such an "internal" LO laser could still be considered to be external to the ICR proper, and the "second optical input" to the ICR would be permanently connected within the common housing, i.e. the LO output port 404 of the test system (FIG. 4) is not connected to the LO input port of the ICR 104 (FIG. 2). On account of this permanent and practically inaccessible connection, only the $CMRR_{SIG}$ could be measured for this case. Furthermore, in order to evaluate the numerator as illustrated in FIG. 3B, a second (external) LO laser would still be needed, since there likely would be no means to switch the optical light path of the internal LO laser.

It should also be noted that, advantageously for embodiments of the present invention directed to CMRR measurement, the optical power levels corresponding to the SIG and LO laser light at the inputs of the ICR are not critical. Nevertheless, these powers should fall within reasonable limits: below a level that may induce an undue degree of total harmonic distortion but sufficiently high to ensure that the resulting differential electrical signals from the ICR are not close to the electronic noise floor. However, it should be appreciated that if one wishes to use the test setup to concurrently measure other specifications (e.g. total bandwidth response, receiver sensitivity, etc.), it may be important to carry out additional calibration procedures. Means to undertake these procedures are well known to those skilled in the art and are not detailed herein.

Figure 8:
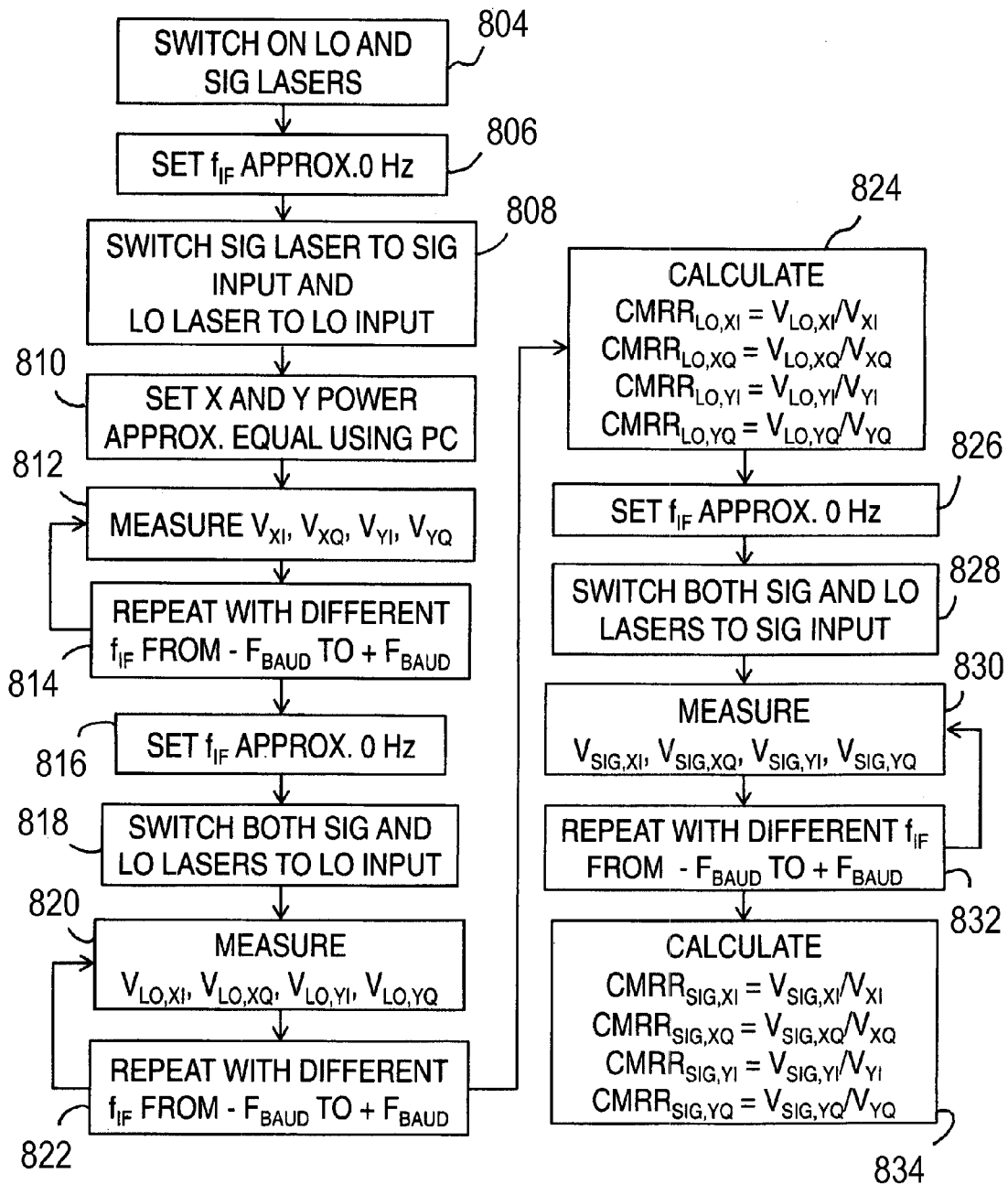
FIG. 8 is a flowchart detailing steps of the method of FIGS. 3A and 3B.
Figure 9:
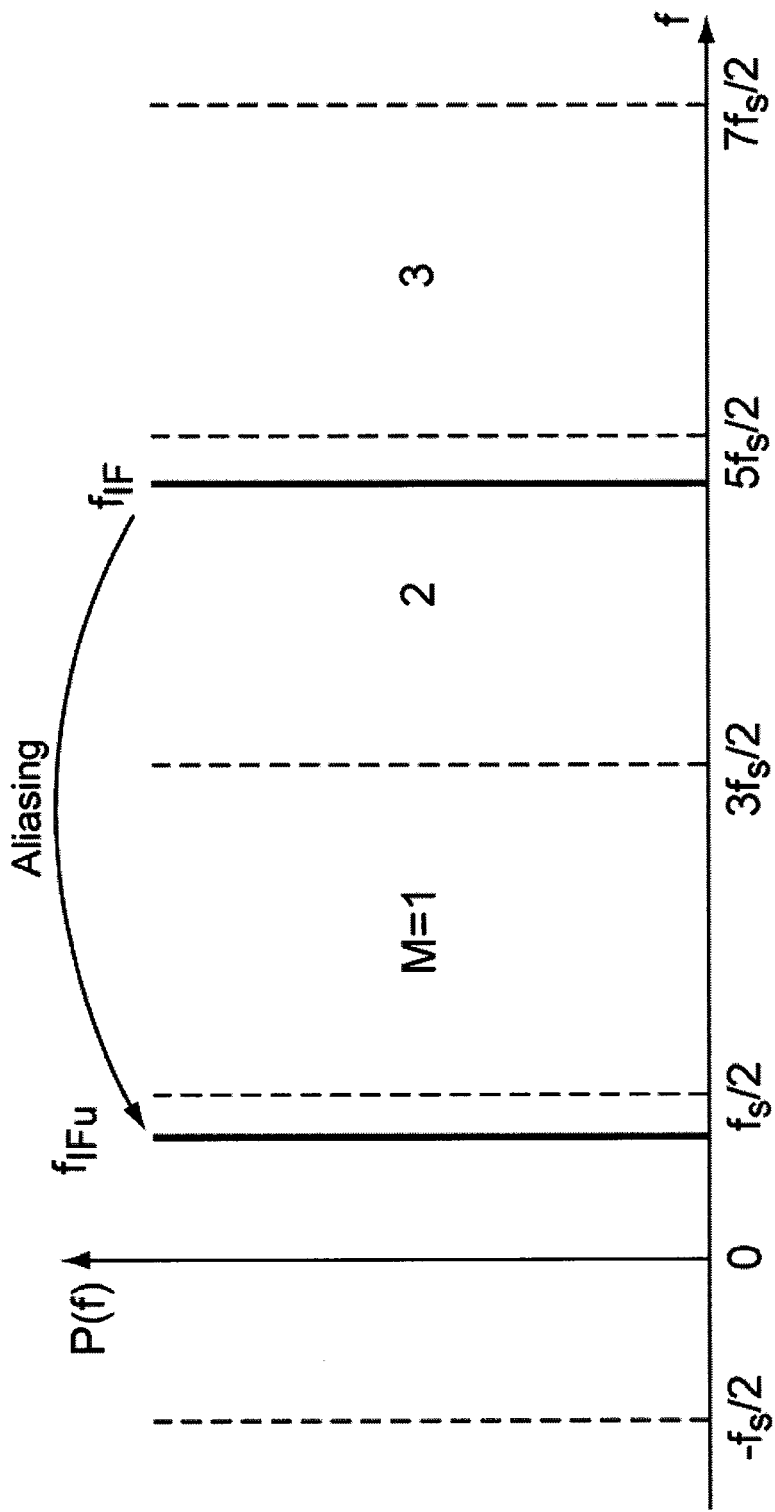
FIG. 9 is a schematic illustrating, in the frequency domain, aliasing of the intermediate frequency $f_{IF}$ in the case of under-sampled measurements performed at a sampling frequency $f_s$.

FIG. 8 illustrates an exemplary characterization method detailing the steps that may be carried out for performing the CMRR characterization method described herein with reference with FIGS. 3A and 3B. The steps of FIG. 8 are herein exemplified with reference to test system 400 of FIG. 4 but it should be noted that the configuration of this test system 400 could be varied without affecting the steps of the method of FIG. 8. Of course, most or all steps of the method of FIG. 8 can be automated and controlled, e.g. via a computer or Central Processing Unit (CPU) integrated in the test system (see FIG. 17).

Steps 804, 806, 808, 810, 812 and 814 are carried out in order to provide the denominator value of Eqs. (1a) and (1b). In step 804, the first (SIG) and second (LO) test lasers 406, 408 are turned on. In step 806, the intermediate frequency $f_{IF}$ is set to approximately 0 Hz by tuning the first (SIG) and second (LO) test lasers 406, 408 to the same optical wavelength. This wavelength is typically selected to fall within the operation range of the ICR under test. In step 808, by employing the optical switching arrangement 410, the first test signal (SIG) 406 is switched to be injected into the SIG optical input 102 of the ICR and the second test signal (LO) 408 is switched for injection into the LO optical input 104 of the ICR. In step 810, optical power levels in the X and Y optical mixers 107 are set to be approximately equal using the polarization controller 411. This is accomplished using feedback from the sampled X and Y electrical outputs 114 of the ICR. For example, the sum of the power levels in XI and XQ may be set approximately equal to that of YI and YQ. It should be understood that the power does not actually need to be equal in the X and Y branches but that a minimum level of power level should simply be present on both branches. In step 812, amplitude levels $V_{XI}$, $V_{XQ}$, $V_{YI}$ and $V_{YQ}$ are measured at the differential electrical outputs 114. In step 814, the wavelength settings of the test lasers 406, 408 are varied to provide different IF values and the measurements are repeated for a plurality of IF values falling within the range delimited by $-f_{BAUD}$ and $+f_{BAUD}$.

Steps 816, 818, 820 and 822 are carried out in order to provide the numerator value of Eqs. (1a) and (1b) for the CMRR characterization corresponding to the LO optical input 104 of the ICR. In step 816, the intermediate frequency $f_{IF}$ is set to approximately 0 Hz by tuning the light emitted by first (SIG) and second (LO) test lasers 406, 408 to the same optical wavelength. In step 818, the first test signal (SIG) 406 and the second test signal (LO) 408 are switched by means of optical switching arrangement 410 so that they are both injected into the LO optical input 102 of the ICR. In step 820, amplitude levels $V_{LO,XI}$, $V_{LO,XQ}$, $V_{LO,YI}$ and $V_{LO,YQ}$ are measured at the differential electrical outputs 114. In step 822, the wavelength settings of the test lasers 406, 408 are varied to provide different IF values and the measurements are repeated for a plurality of IF values falling within the range delimited by $-f_{BAUD}$ and $+f_{BAUD}$.

In step 824, the CMRR characterization corresponding to the LO optical input 104 of the ICR can be derived from the value measured in steps 812 and 820 as:

$$CMRR_{LO,XI}(f_{IF})=V_{LO,XI}(f_{IF})/V_{XI}(f_{IF})$$

$$CMRR_{LO,XQ}(f_{IF})=V_{LO,XQ}(f_{IF})/V_{XQ}(f_{IF})$$

$$CMRR_{LO,YI}(f_{IF})=V_{LO,YI}(f_{IF})/V_{YI}(f_{IF})$$

$$CMRR_{LO,YQ}(f_{IF})=V_{LO,YQ}(f_{IF})/V_{YQ}(f_{IF})$$

Steps 826, 828, 830, 832 and 834 are carried out in order to provide the numerator value of Eqs. (1a) and (1b) for the CMRR characterization corresponding to the SIG optical input 102 of the ICR. In step 826, the intermediate frequency $f_{IF}$ is again set to approximately 0 Hz by tuning the first (SIG) and second (LO) test lasers 406, 408 to the same optical wavelength. In step 828, by employing the optical switching arrangement 410, the first test signal (SIG) 406 and the second test signal (LO) 408 are switched so that they are both injected in the SIG optical input 102 of the ICR. It is noted that, as in step 810, optical power levels in the X and Y optical mixers 107 should be approximately equal. However, it is herein assumed that this condition has not changed between step 810 where this was set, and step 828. Of course, steps 808 and 810 may be repeated before step 828 should this be necessary. In step 830, amplitude levels $V_{SIG,XI}$, $V_{SIG,XQ}$, $V_{SIG,YI}$ and $V_{SIG,YQ}$ are measured at the differential electrical outputs 114. In step 832, the wavelength settings of the test lasers 406, 408 are varied to provide different IF values and the measurements are repeated for multiple IF values between $-f_{BAUD}$ and $+f_{BAUD}$.

In step 834, the CMRR characterization corresponding to the SIG optical input 104 of the ICR can be derived from value measured in steps 812 and 830 as:

$$CMRR_{SIG,XI}(f_{IF})=V_{SIG,XI}(f_{IF})/V_{XI}(f_{IF})$$

$$CMRR_{SIG,XQ}(f_{IF})=V_{SIG,XQ}(f_{IF})/V_{XQ}(f_{IF})$$

$$CMRR_{SIG,YI}(f_{IF})=V_{SIG,YI}(f_{IF})/V_{YI}(f_{IF})$$

$$CMRR_{SIG,YQ}(f_{IF})=V_{SIG,YQ}(f_{IF})/V_{YQ}(f_{IF})$$

As mentioned herein above, an alternative approach to steps 810 and 812 comprises setting the polarization controller to maximize the power level in the X and Y branches separately and measuring the amplitude levels of the X outputs and the Y outputs sequentially. In this case, the measured values of $V_{XI}$, $V_{XQ}$, $V_{YI}$ and $V_{YQ}$ should be multiplied by a factor of $\sqrt{2}$ before calculating the CMRR, e.g.

$$CMRR_{LO,XI}(f_{IF})=V_{LO,XI}(f_{IF})/(\sqrt{2}V_{XI}(f_{IF}))$$

Undersampling and IF Calculation

If the electrical outputs of the ICR under test are sampled in "real-time", i.e. at a sampling rate $f_s$ approximately equal to or greater than the approximately $2f_{BAUD}$ sampling rate used in the ICR in normal use (e.g. by means of a commercially-available high-speed multi-channel oscilloscope), the value of $f_{IF}$ can be determined by performing a Fourier transform, conveniently a Fast Fourier Transform (FFT), of e.g. the electric field generated by XI and XQ sinusoidal waves, leading to a well-defined tone in the spectrum representing IF. (An example of such an approach is described in published application US 2013/0237202 to Abe et al.) However, if undersampling is employed (i.e., $|f_{IF}|>f_s/2$), the actual IF tone will be aliased and folded into the FFT spectrum, appearing at a different apparent frequency $f_{IFu}$ within $\pm f_s/2$, rendering the true $f_{IF}$ value ambiguous and difficult to determine.

The true intermediate frequency $f_{IF}$ can be computed from the aliased $f_{IFu}$ assuming that the undersampling folding ratio (denoted by the integer M) is known, via the following equation:

$$f_{IF} = f_{IFu} + M \cdot f_s \quad (6)$$

In one preferred embodiment, the target frequency-offset ($f_{IF,set}$), given by the "set" spectral separation of the two closely-spaced laser wavelengths, relates to the actual intermediate frequency, $f_{IF}$, via $$f_{IF,set} - \Delta f \leq f_{IF} \leq f_{IF,set} + \Delta f \quad (7)$$

where $\Delta f$ is the uncertainty in the intermediate-frequency setting (with respect to the a priori-unknown true spectral separation). The uncertainty $\Delta f$ is minimized by e.g. factory calibration, or, if necessary, by daily or weekly on-site calibration. Moreover, the magnitude of this remaining uncertainty, $\Delta f$, normally also would be approximately known (e.g. from the above-mentioned calibration procedures or "by design"). An estimated folding ratio $M_{set}$ can then be computed based on $f_{IF,set}$ and a precise determination of $f_{IF}$ is then achieved from the frequency of the aliased tone at $f_{IFu}$ in the Fourier spectrum of at least one polarization component of the measured complex field, e.g. the measured electrical signals corresponding to the in-phase and quadrature-phase components of the X polarization (XI, XQ). However, a prerequisite condition for the reliable determination of an $f_{IF}$ value is that the integer difference between M and $M_{set}$ be known (e.g. −1, 0, +1).

The relationship between $f_s$ and the uncertainty ($\Delta f$) associated with the selected laser offset values $f_{IF,set}$ may be classified into three cases.

Case 1: If $\Delta f$ is small, then direct use of the set values ($f_{IF} = f_{IF,set}$) has no significant impact on measured ICR parameters to within some predetermined measurement tolerance, and hence there is no need to seek greater accuracy of the measured tone at frequency $f_{IF}$ (e.g. via an algorithmic procedure as outlined with reference to "Case 3" hereinbelow). Here $M = M_{set}$.

Figure 10:
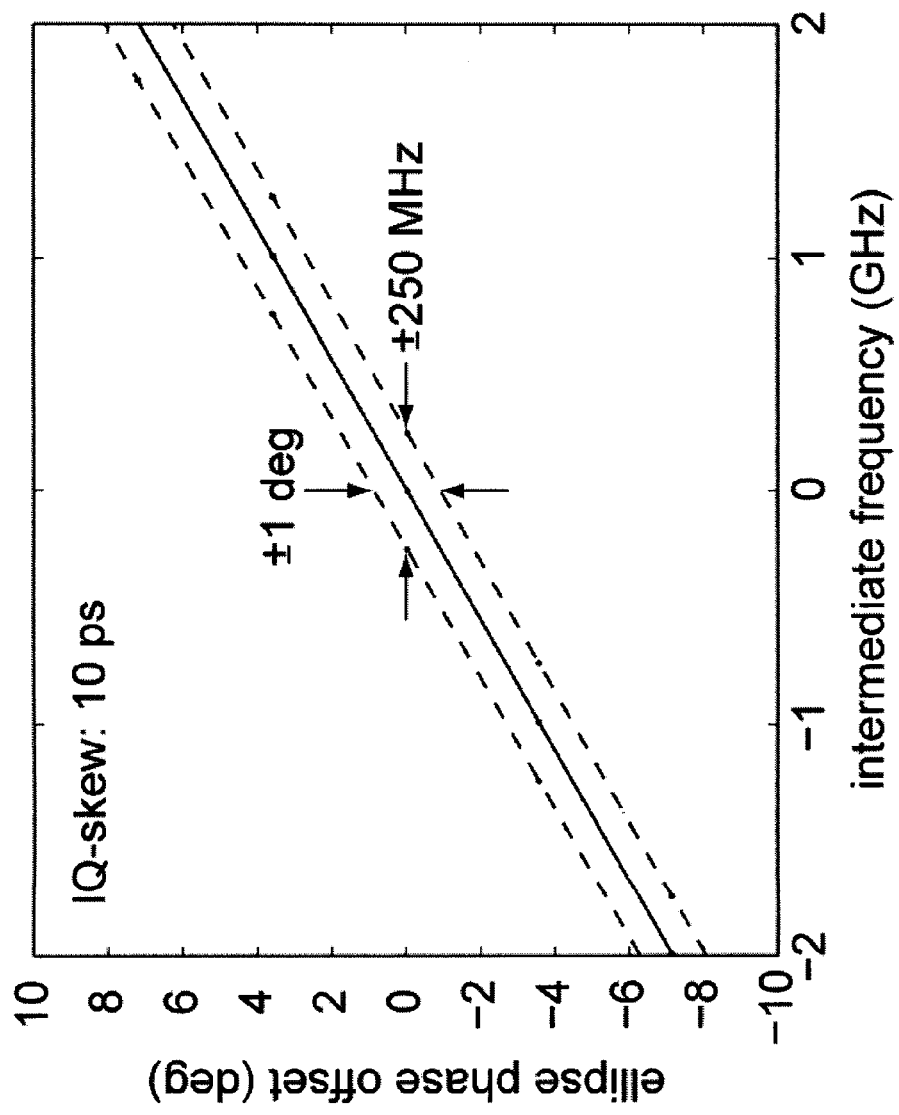
FIG. 10 is a graph illustrating the sensitivity of the IQ-ellipse phase offset characterization to an uncertainty $\Delta f$ in the actual value of intermediate frequency $f_{IF}$, for an IQ skew of 10 ps.

The CMRR measurement itself is generally not highly dependent on the exact value of $f_{IF}$. However, other related measurements that may also be performed in the context of ICR characterization might be more stringent in this regard. For instance, measurement of the hybrid phase error is quite sensitive to the value of $f_{IF}$ and hence a systematic offset in $f_{IF}$ may introduce a non-negligible measured phase error, whereas the effect of a randomly-varying offset in $f_{IF}$ normally would be less detrimental, as this randomly-varying offset could be reduced via averaging. FIG. 10 presents the results of a simulation of the IQ-ellipse phase offset as a function of $f_{IF}$ for an IQ skew of 10 ps (maximum allowable channel skew in the OIF Implementation Agreement) and a hybrid phase error of zero. The solid line represent an accurate $f_{IF}$ and, consequently, the phase offset equals zero for $f_{IF} = 0$. The dashed lines show the effect of systematic $f_{IF}$ offsets of ±250 MHz, which result in respective hybrid phase errors of about 1 degree. The OIF Implementation Agreement specifies a maximum phase error of 5 degrees and, hence, a 1-ps measurement uncertainty is a reasonable target. Consequently, Case 1 requires laser sources exhibiting "laboratory-grade" optical-frequency stability, and would likely necessitate calibration of the test system on a regular basis. Note that, even if typical currently-available telecom-grade lasers (such as the Model TTX1994 ITLA manufactured by Emcore) were to be calibrated on a daily basis, uncertainties resulting from the laser optical-frequency stability and wavelength calibration would likely still be excessive.

Case 2: When the uncertainty $\Delta f$ is very high (e.g. $\Delta f > f_s/2$), little or no improvement in the $f_{IF}$ accuracy can be attained via analysis of the Fourier spectra of e.g. the complex IQ field, since the folding ratio (M) associated with the aliasing will often be incorrect. Hence, CMRR evaluation via undersampling would normally not be feasible for this case.

Figure 11:
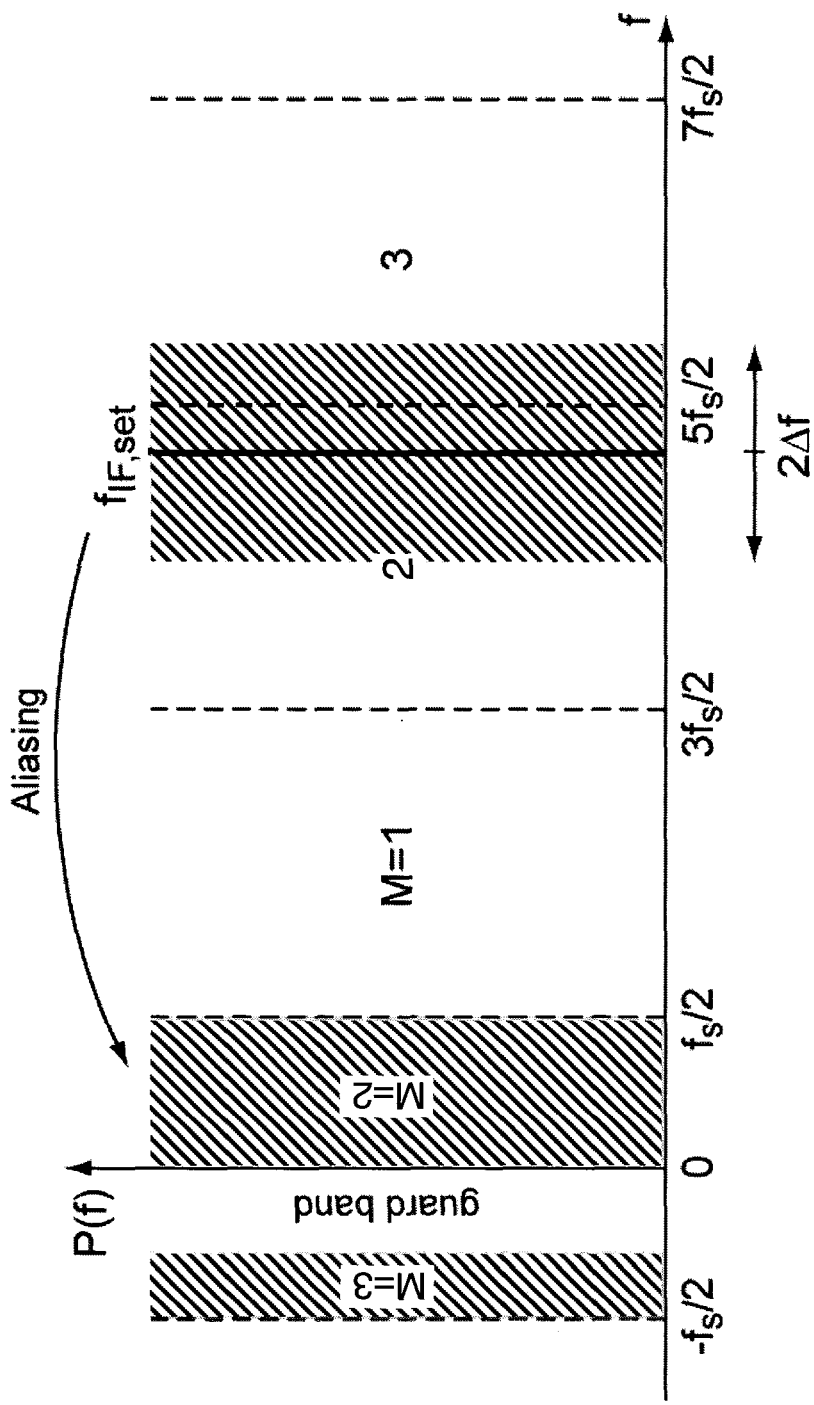
FIG. 11 is a schematic illustrating, in the frequency domain, the aliasing of the intermediate frequency in the case of undersampling two outputs of the ICR.

Case 3: If the uncertainty $\Delta f$ is of a level intermediate to that of Cases 1 and 2 above, i.e. for which direct estimation according to Case 1 would not be fully reliable but for which $\Delta f < f_s/2$, enabling the correct folding ratio M to be estimated in terms of $M_{set}$, then the accuracy of the estimated $f_{IF}$ can be improved by Fourier analysis. FIG. 11 shows an example where $\Delta f < f_s/2$ and $f_{IF,set}$ is close to $5f_s/2$. Hence, the true $f_{IF}$ may fall either below or above $5f_s/2$ (i.e. the corresponding folding ratio may be M=2 or M=3, respectively), as indicated by the shaded frequency range, which extends from ($f_{IF,set} - \Delta f$) to ($f_{IF,set} + \Delta f$). As a result of aliasing, this true frequency range is folded to an aliased frequency range extending from $-f_s/2$ to $+f_s/2$, for the case where in-phase and quadrature-phase signals are simultaneously sampled. (If only one of in-phase and quadrature-phase signals were sampled, then the aliased frequency range would extend only from 0 to $+f_s/2$.) Since $\Delta f < f_s/2$, there is a "guard band" separating those frequencies corresponding to M=2 and M=3. Hence, as long as there is a guard band of non-zero "width" ($\Delta f < f_s/2$), an arbitrary $f_{IF,set}$ can be correctly resolved. The ratio $f_{IF,set}/f_s$ indicates the nearest aliasing "border" $(2n+1)f_s/2$, where n is an integer, defining those M values corresponding to frequencies between which the guard band lies.

In practice, the OIF Implementation Agreement for 100 G ICRs requires testing of ICR parameters, such as rf bandwidth and CMRR, up to at least 22 GHz. A commercially available Integrable Tunable Laser Assemblies (ITLA) generally comprises two cw tunable laser sources, for which the uncertainty in the optical-frequency settability is typically less than 250 MHz (as is the case for the aforementioned Emcore laser). Hence, with such lasers, unambiguous folding-ratio determination should be feasible for sampling rates $f_s$ of approximately 500 MHz or more.

Cases 1 and 3 are compatible with CMRR measurement employing undersampling.

For Case 1, one assumes that $f_{IF} = f_{IF,set}$ (i.e. that the uncertainty $\Delta f$ associated with $f_{IF,set}$ may be neglected), and hence:

$$M = M_{set} = \text{ROUND}(f_{IF,set}/f_s) \quad (8)$$

where the ROUND function rounds the result to the nearest integer value. Then, from Eq. (6), the frequency $f_{IFu}$ of the aliased tone corresponding to the IF will appear as:

$$f_{IFu} = f_{IF,set} - M_{set} \cdot f_s \quad (6a)$$

However, if $f_{IF,set}/f_s$ is a half odd-integer value (e.g. 3.500=7/2), then one cannot distinguish between M=3, M=4. (By convention the ROUND function yields the higher of the two possible integers, but of course mathematically both integer solutions are possible.) For such a case, one may resolve the ambiguity by one of either:
- a) Setting the two lasers to a slightly different optical-frequency spacing, $f_{IF,set}'$, thereby yielding a unique M value; and
- b) Sampling the electrical outputs at a different known "second" sampling rate $f_s'$, different than the "first" sampling rate.

Case 3 will now be discussed with reference to a preferred embodiment for which both the in-phase and quadrature-phase components are sampled. The folding ratio M of the measured tone at aliased frequency $f_{IF,u}$ may be evaluated in terms of the initial estimate of the intermediate frequency, $f_{IF,set}$, the uncertainty in the $f_{IF,set}$ value, $\Delta f$, and the known sampling frequency, $f_s$. The estimated folding ratio, $M_{set}$, corresponding to $f_{IF,set}$ may be calculated in terms of $f_{IF,set}$ and $f_s$ via Eq. (8).

It is also convenient to introduce the parameter $f_{IFu,set}$, which, from Eq. (6), may be expressed in terms of $M_{set}$ as:

$$f_{IFu,set} = f_{IF,set} - M_{set} \cdot f_s \quad (6b)$$

Now, the actual folding ratio M may now be evaluated by means of the following algorithm:

$$(I) \text{ If}(f_{IF,set}+\Delta f)>(M_{set}+\tfrac{1}{2})\cdot f_s, \text{ and if } f_{IF,u}<(f_{IFu,set}-\Delta f),$$
$$\text{then } M=M_{set}+1; \quad (9a)$$

$$(II) \text{ Otherwise, if } f_{IF,set}-\Delta f<(M_{set}-\tfrac{1}{2})\cdot f_s, \text{ and if }$$
$$f_{IF,u}>f_{IFu,set}+\Delta f, \text{ then } M=M_{set}-1; \quad (9b)$$

$$(III) \text{ Otherwise, } M=M_{set} \quad (9c)$$

Once M has been so determined, the actual (non-aliased) intermediate frequency $f_{IF}$ may then be evaluated from the apparent frequency of the corresponding undersampled tone, $f_{IFu}$, via the relationship of Eq. (6).

Now, as with Case 1 described hereinbefore (for which the uncertainty $\Delta f$ was assumed to be zero), if $f_{IF,set}/f_s$ is substantially equal to a half odd integer, the measurement should be performed again using one of either:
- a) Setting the two lasers to a different optical-frequency spacing, $f_{IF,set}'$, thereby yielding a unique M value; and
- b) Sampling the electrical outputs at a different known "second" sampling rate $f_s'$.

For (a) above, a suitable different setting of the optical-frequency spacing would be $f_{IF,set}' \approx (f_{IF,set}+0.5f_s)$. For (b) above, a suitable second sampling rate would be $f_s' \approx f_{IF,set}/((f_{IF,set}/f_s)+0.5)$. Other settings may also be envisaged.

Of course, for many practical test scenarios, measurements of CMRR (and other ICR parameters) will be taken for a plurality of $f_{IF}$ values. If these $f_{IF}$ values are sufficiently closely spaced, it should often be feasible to ensure unambiguous determination of M by interpolation.

Total Harmonic Distortion (THD)

The total harmonic distortion is a measure of the nonlinearity due to saturation of the receiver, especially due to the TIA. The THD is defined as the ratio between the power ($P_1$) of the fundamental frequency (i.e. $f_{IF}$), and the sum of the powers of all higher-order harmonics ($P_2+\ldots+P_N$). Alternatively, an amplitude-ratio definition of THD may be expressed in terms of the square root of this ratio, i.e.

$$THD = \left(\frac{P_2+P_3+\ldots+P_N}{P_1}\right)^{1/2}. \quad (10)$$

Figure 12:
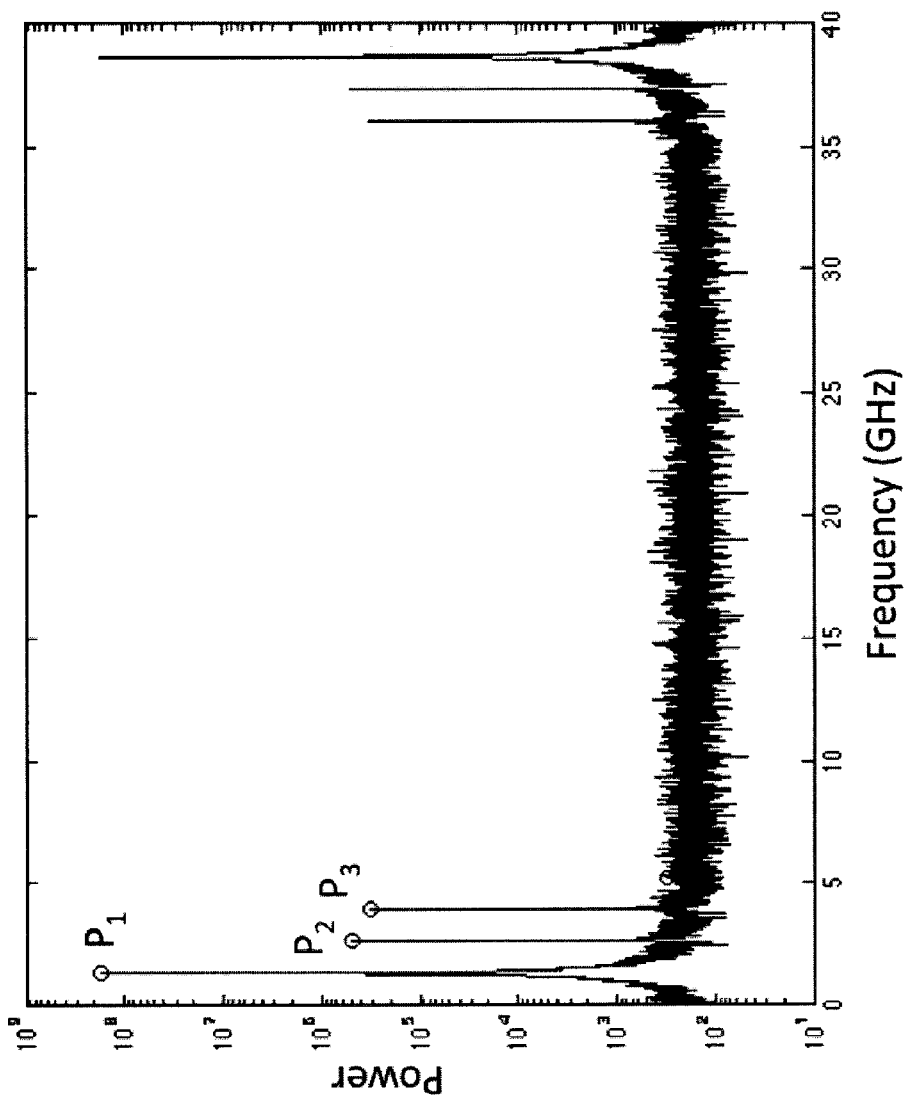
FIG. 12 is a graph showing simulation results, in the frequency domain, as obtained from real-time (Nyquist) sampling of the output of an ICR and showing harmonics of the fundamental intermediate frequency $f_{IF}$ appearing at $f=2 \cdot f_{IF}$ and $f=3 \cdot f_{IF}$.

The rf frequency spectrum can be determined by means of a suitable electrical spectrum analyzer, and the fundamental frequency and the higher-order harmonics retrieved therefrom. The THD can also be measured with a high-bandwidth real-time oscilloscope. Upon application of a fast Fourier transform (FFT) to the sampled signal s(t), i.e. $S(f)=F\{s(t)\}$, the THD can be calculated from the power spectrum, i.e. $|S(f)|^2$, as shown in FIG. 12. The power $P_1$ of the fundamental frequency at $f_1$ corresponds to the magnitude of the corresponding calculated tone, whereas the higher-order harmonics $P_2$ and $P_3$, etc., appear at $f_2=2f_1$ and $f_3=3f_1$, etc. In this example, the IF frequency, $f_{IF}=f_1=1.3$ GHz, and the sampling frequency $f_s$ is 40 GS/s. The higher-order harmonics appear at $f_2=2.6$ GHz and $f_3=3.9$ GHz, etc.

Figure 13:
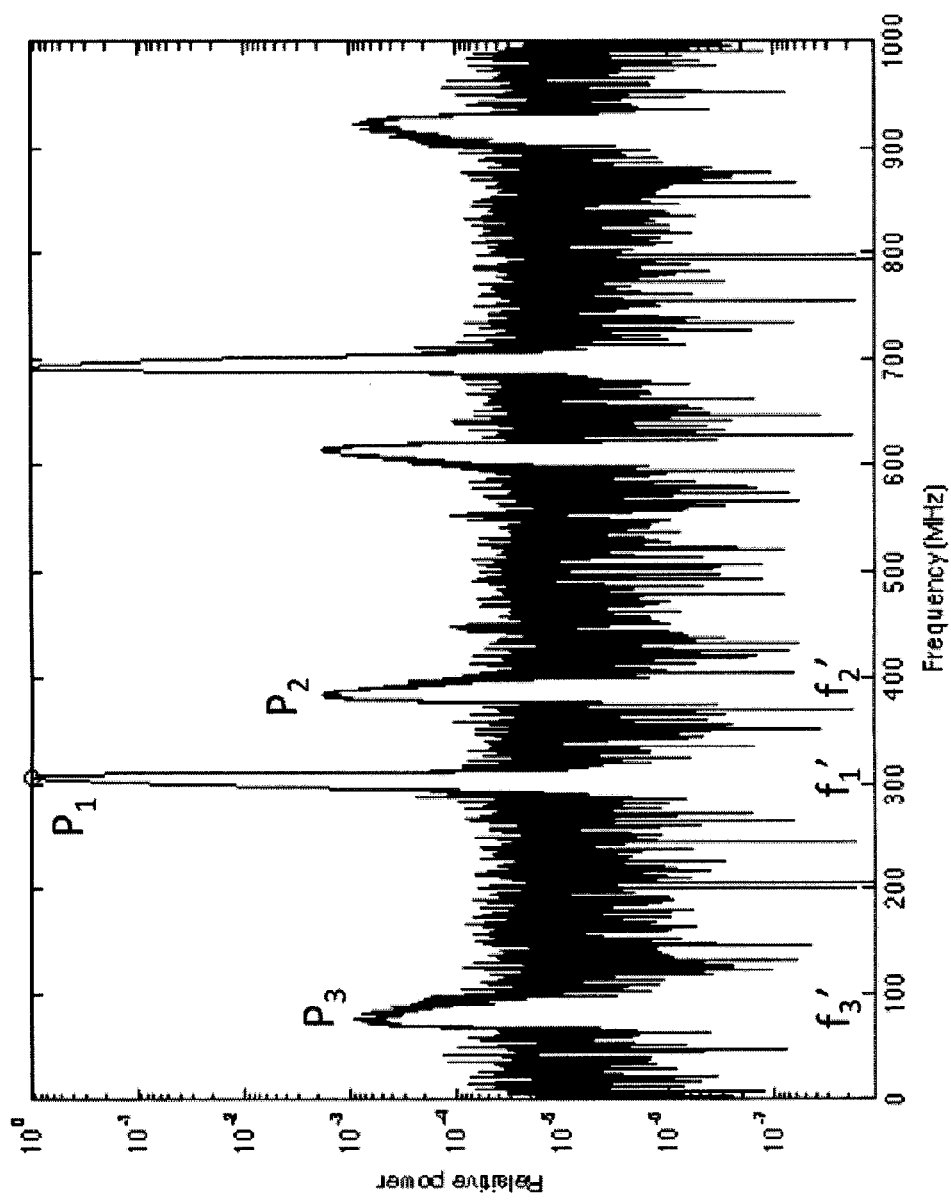
FIG. 13 is a graph showing simulation results, in the frequency domain, for the case of undersampling at 1 GHz the fundamental intermediate frequency $f_{IF}'=1.3$ GHz and showing harmonics of appearing at $f_2'=300$ GHz and $f_3'=400$ GHz.

When undersampled, the higher-order harmonics (each normally corresponding to respective different M values) are aliased together with the fundamental frequency. If the intermediate frequency, $f_{IF}$, is a priori known to high accuracy (Case 1 hereinabove), or if the algorithm for determining $f_{IF}$ is employed (Case 3 hereinabove), one is also able to subsequently calculate the folded frequencies ($f_2'$, $f_3'$, etc.) to which $2f_{IF}$, $3f_{IF}$, etc. will be aliased. FIG. 13 shows an example of a power spectrum, $|U(f)|^2$, resulting from application of an FFT to the undersampled signal batch u(t), where $F\{u(t)\}=U(f)$. In most cases, when the frequency components are well separated, it is sufficient to identify their respective powers directly from the rf baseband spectrum. In addition, the signal may be filtered to remove noise and the integrated power corresponding to each harmonic determined, for example by convolution in the frequency domain, i.e. $G(f)=|U(f)|^2 * g(f)$, where g(f) is a narrow numerical filter (e.g. of Gaussian shape). This procedure improves the measurement accuracy and enables detection of the harmonics at lower power.

Figure 14B:
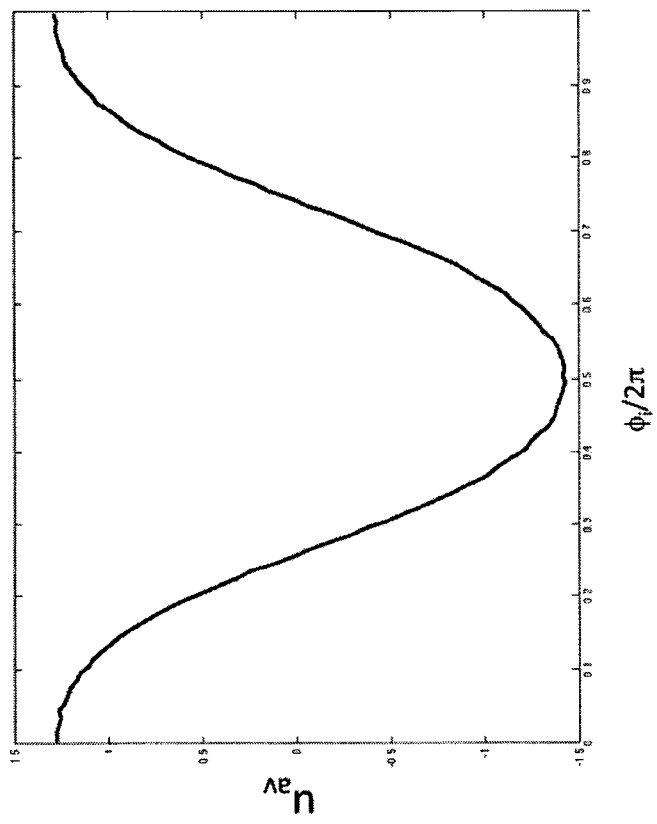
FIG. 14 comprises FIG. 14A, 14B which are graphs respectively showing superposed individual samples and an average of the samples after application of software synchronization.
Figure 14A:
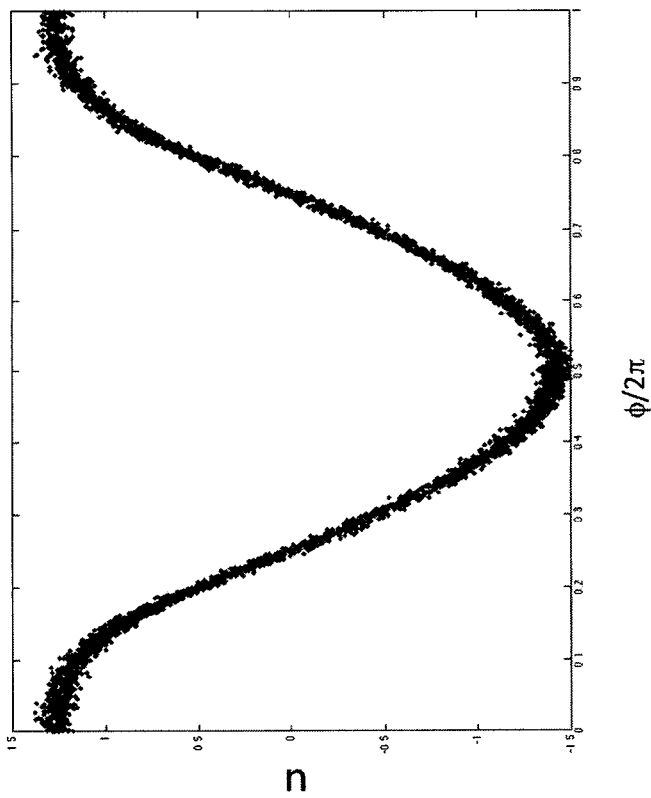

In some cases, the spectrum may be obscured by excessive optical frequency dithering (of one or both of the lasers), which, especially when combined with a low sampling rate, renders more difficult the identification of $f_2'$ and $f_3'$ directly in the Fourier domain. However, application of a software-synchronization procedure provides a more robust method for tracking the IF tone, and more reliably identifies the higher harmonics. By numerically placing a narrow single-side-band filter h(f) about the maximum (e.g. a filter of Gaussian shape width $\Delta f_h$) and applying the inverse Fourier transform, one obtains the function $p(t)=F^{-1}\{U(f)h(f)\}$. If the fundamental frequency peak is broad due to e.g. laser phase noise or frequency dithering, the filter bandwidth $\Delta f_h$ must be large enough to track the phase. Alternatively, instead of centering the filter about the maximum of the peak, it may be centered about the center of mass $\mu=\Sigma(f|U(f)|^2)/\Sigma(|U(f)|^2)$. Now, If the individual samples, u(t), are plotted as a function of the phase evolution of this signal, $\phi(t)=\arg\{p(t)\}/2\pi$, one obtains the software-synchronized signal shown in FIG. 14A, i.e. $u(\phi(t))$ for one period or unit interval. By binning all samples that fall within a pre-defined phase interval, i.e. $\phi_i=\{\phi<2\pi/N \text{ and } \phi>2\pi(i-1)/N\}$, where i=1, 2, ..., N, a "noise-filtered" signal, $p(\phi)$, may be synthesized, as shown in FIG. 14B.

Figure 15:
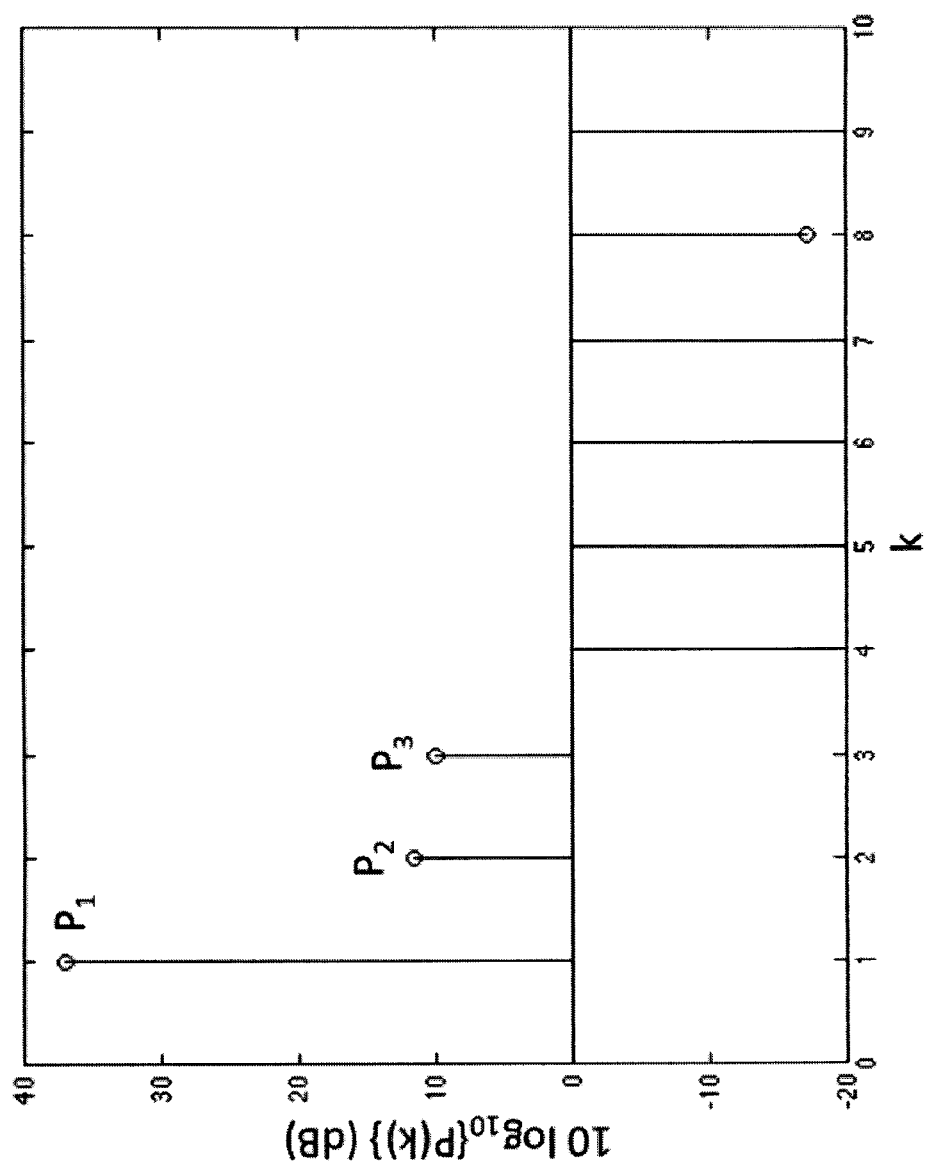
FIG. 15 is a graph illustrating, in the frequency domain, the power spectrum of the sampled output of an ICR (including harmonics) and as obtained from an averaged software synchronized signal.

Next, an N-point discrete Fourier transform is applied to $p(\phi_i)$ to provide a power spectrum $P(k)=|F\{u_{av}(\phi_i)\}|^2$, where k=0, 1, ..., N−1, as shown in FIG. 15. The peaks in this power spectrum ($P_1; P_2, \ldots P_k$) correspond to the power at $f_{IF}$ as well to the powers at the discernable harmonics thereof ($f_2, f_3, \ldots, f_k$). The THD can then be estimated by inserting these powers into Eq. (10) (or any alternative expression for the THD). In this example the THD=$(2.8E-3+1.9E-3+5.0E-7+\ldots)^{1/2}$=6.9%. For comparison, the THD calculated using real-time sampling of the signal also yields a THD=6.9%.

Figure 16:
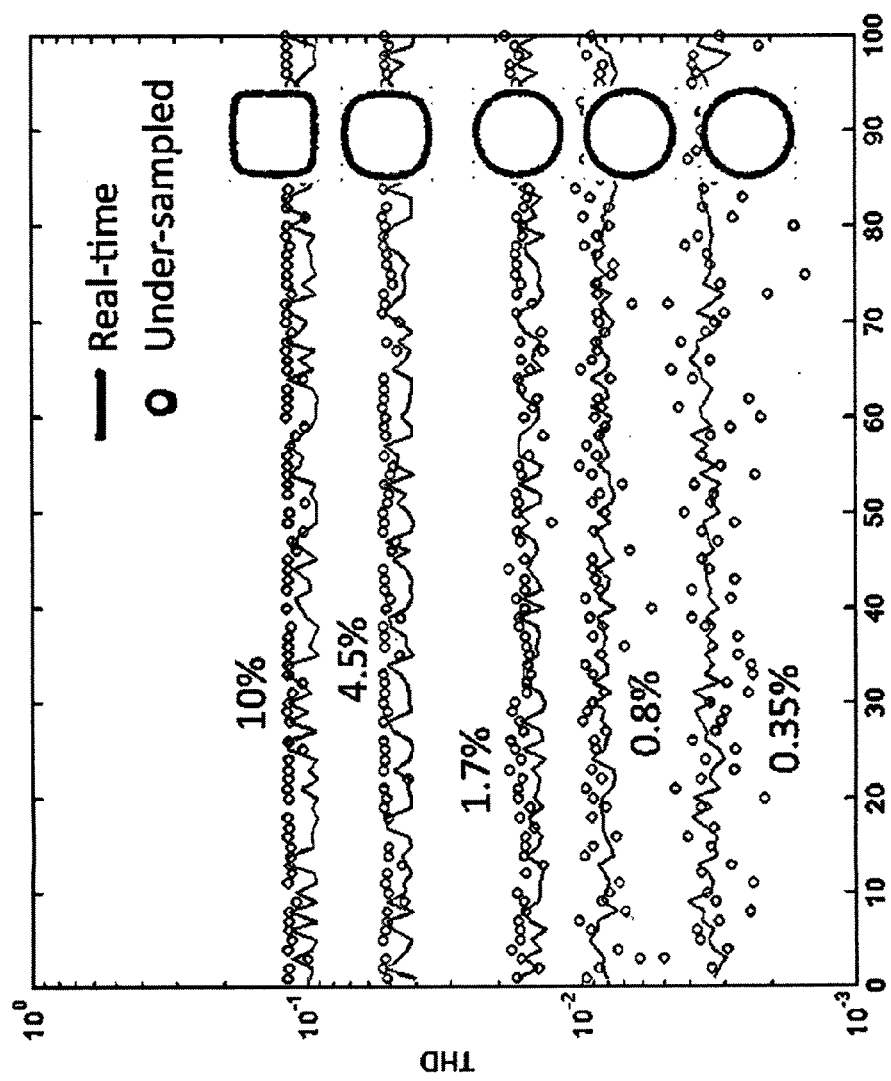
FIG. 16 is a graph comparing Total Harmonic Distortion (THD) of the sampled output of an ICR as obtained using real-time (Nyquist) sampling with that obtained with undersampling, wherein insets illustrate XI-XQ plots resulting from the respective THD level.

When $f_1'$ is near DC or $f_s/2$ (i.e. $f_1'<2\pi f_h$ or $|f_s/2-f_1'|<2\Delta f_h$, respectively, where $\Delta f_h$ is the filter bandwidth in the above-described software-synchronization procedure), there is a risk that the software synchronization may fail, and, as a consequence, the estimated THD may be inaccurate. If the IF value $f_{IF}$ falls within these particular frequency zones, the result is discarded and a new measurement is taken. FIG. 16 presents a comparison between the real-time sampling method and the undersampling method employed in embodiments of the present invention. The lowest level of THD that may be measured with this approach depends on the noise and on the linearity of the measuring equipment, principally the track-and-hold (T/H) components and ADC.

The OIF Implementation Agreement (loc. cit.) recommends that the THD measurement be carried out at an IF value $f_{IF}$ of 1000±50 MHz and that the optical power levels injected into the ICR under test should be at specified levels. Furthermore the ICR gain should be set such that the peak-to-peak output voltage is at a specified level. These settings are required in order to ensure that measurements can be reproduced (e.g. an incoming inspection "spot check" by the customer) under the same conditions of linearity.

Measurement of Other ICR Parameters

Aspects of the present invention are primarily directed to measurement of CMRR and THD, using both real-time and undersampling of the signals. However, embodiments of the invention are advantageously compatible with characterization of other ICR parameters relevant to the OIF Implementation Agreement. Examples of other such parameters include the Optical Return Loss (ORL), frequency response (bandwidth), low frequency cutoff (LFC), and dc responsivity. Typically, measurement of these other parameters requires only relatively minor modifications to a test setup expressly designed for CMRR measurement alone, for instance. However, certain such measurements may require more stringent calibration of the test system (e.g. accurate measurement of the optical input power in order to evaluate the ORL), but this may be readily implemented (e.g. use of forward 411 and backward 420 monitoring ports for the ORL, as indicated in FIG. 4). Further advantageously, certain parameters could be measured concurrently.

What is claimed is:

1. A method for characterizing a parameter of an Integrated Coherent Receiver (ICR) being designed for normal use to receive a phase-modulated optical communication signal transmitted at a specified symbol rate $f_{BAUD}$, and comprising:
    two optical input ports,
    an optical hybrid arrangement for heterodyne mixing of signals to be received at the two optical input ports, at a pair of complementary optical outputs, and
    a pair of balanced photodetectors to detect light exiting corresponding said pair of complementary optical outputs, to provide a differential electrical signal at an electrical output,
the method comprising the steps of:
    providing a first polarized highly-coherent optical test signal at optical frequency $v_1$ and a second polarized highly-coherent optical test signal at optical frequency $v_2$ for injection into the ICR, said first and second test signals having respective optical frequencies mutually spaced by an intermediate frequency $f_{IF}=v_2-v_1$;
    injecting the first test signal into one of the two optical input ports of the ICR and the second test signal into the other of the two optical input ports, and sampling the electrical output of the ICR at a known primary sampling rate $f_s$ to provide a denominator value, the electrical output being responsive to heterodyne mixing of said first and second optical test signals;
    injecting co-propagating said first and second test signals into a given one of the two optical input ports, and sampling the electrical output of the ICR at said primary sampling rate fs to provide a numerator value corresponding to said given one of the two optical input ports, the electrical output being responsive to heterodyne mixing of said first and second optical test signals; and
    calculating a value of said parameter from said numerator and denominator values.

2. The method as claimed in claim 1, wherein:
    said two input ports of the ICR correspond to a signal input (SIG) port, normally used for receiving the phase-modulated communication signal, and a local oscillator (LO) input port, respectively; and
    said parameter comprises a Common Mode Rejection Ratio (CMRR) for said electrical output at said intermediate frequency $f_{IF}$, corresponding to injection of said co-propagating test signals into said given one of the signal (SIG) and local oscillator (LO) input ports, a value of the CMRR being proportional to a ratio of the numerator value with respect to the denominator value.

3. The method as claimed in claim 2, wherein the method is repeated with the other of said specified one of the signal (SIG) and local oscillator (LO) input ports.

4. The method as claimed in claim 2, wherein the ICR comprises a plurality of said pair of complementary optical output, a respective plurality of said pair of balanced detectors, and a respective plurality of said electrical output, the sampling steps being repeated for each of said plurality of said electrical output in order to calculate corresponding values of said parameter.

5. The method as claimed in claim 4, wherein
    said phase-modulated optical communication signal comprises two spectrally-superposed orthogonal polarization components (X,Y);
    said optical hybrid arrangement comprises two optical mixers, each mixer receiving a respective one of two orthogonally-decomposed polarization-analyzed portions of the first and second optical test signals injected into the optical input ports; and
    the plurality of said electrical output includes at least two of IX, QX, IY, QY.

6. The method according to claim 5, wherein the state of polarization (SOP) of each of the polarized optical test signals with respect to the optical input ports such that the two optical mixers simultaneously receive mutually-orthogonal analyzed portions of each of the first and second optical test signals, these respective mutually-orthogonal analyzed portions being substantially of equal magnitude.

7. The method as claimed in claim 5, further comprising adjusting the state of polarization (SOP) of each of the polarized optical test signals with respect to the optical input ports using at least one polarization controller (PC), such that:
    one of the optical test signals is decomposed in the ICR into mutually-orthogonal analyzed portions of substantially equal magnitude, each of said portions being received by a respective one of the two optical mixers; and
    the magnitude of the other of said optical test signals received by one of the two optical mixers is maximized.

8. The method as claimed in claim 5, wherein said steps of the method are repeated to measure the CMRR for a plurality of combinations of input ports and electrical outputs.

9. The method as claimed in claim 2, wherein the method is repeated to measure the CMRR at least another value of intermediate frequency $f_{IF}$.

10. The method as claimed in claim 1, wherein said primary sampling rate $f_s$ is more than two times the value of said intermediate frequency and wherein said value of said intermediate frequency is determined from the electrical output sampled at said primary sampling rate $f_s$.

11. The method as claimed in claim 1, wherein:
said sampling rate fs is less than two times the value of said intermediate frequency $f_{IF}$ such that said detection of said electrical output of the ICR is undersampled detection, and
$f_{IF}$ is known to fall within an interval defined by an uncertainty $\Delta f_{IF}$ associated with an approximately known intermediate-frequency set value $f_{IF,set}$ such that it satisfies $$f_{IF,set} - \Delta f_{IF} \leq f_{IF} \leq f_{IF,set} + \Delta f_{IF},$$

the uncertainty $\Delta f_{IF}$ being less than half the primary sampling rate $f_s$;
the method further comprising an IF determination procedure comprising the steps of:
sampling at least two of said differential electrical signals at said primary sampling rate $f_s$, the electrical signals corresponding to respective ones of an in-phase representation and a quadrature-phase representation (IX, QX; IY, QY) of the heterodyne-mixed coherent optical test light;
identifying, in the frequency domain, an aliased tone corresponding to said intermediate frequency $f_{IF}$ at a corresponding aliased frequency $f_{IF,u}$;
evaluating the value of said intermediate frequency $f_{IF}$ at least from the aliased frequency value $f_{IF,u}$, the intermediate-frequency set value $f_{IF,set}$, the uncertainty $\Delta f_{IF}$ and the known primary sampling rate $f_s$.

12. The method as claimed in claim 11, wherein said evaluating the value of said intermediate frequency $f_{IF}$ comprises determining an integer representing a undersampling folding ratio M, said folding ratio M satisfying a folding ratio condition for which:
I. if $$(f_{IF,set} + \Delta f) > \left[\mathrm{ROUND}\left(\frac{f_{IF,set}}{f_s}\right) + 1/2\right] \cdot f_s,$$

and if $f_{IF,u} < (f_{IFu,set} - \Delta f)$, then $$M = \mathrm{ROUND}\left(\frac{f_{IF,set}}{f_s}\right) + 1;$$

otherwise:
II. if $$f_{IF,set} - \Delta f < \left[\mathrm{ROUND}\left(\frac{f_{IF,set}}{f_s}\right) - 1/2\right] \cdot f_s,$$

and if $f_{IF,u} > (f_{IFu,set} + \Delta f)$, then $$M = \mathrm{ROUND}\left(\frac{f_{IF,set}}{f_s}\right) - 1;$$

otherwise:
III.

$$M = \mathrm{ROUND}\left(\frac{f_{IF,set}}{f_s}\right);$$

wherein $$f_{IFu,set} = f_{IF,set} - f_s \cdot \mathrm{ROUND}\left(\frac{f_{IF,set}}{f_s}\right),$$

said value of intermediate frequency $f_{IF}$ then being related to said aliased frequency value $f_{IF,u}$, said sampling rate $f_s$, and said undersampling folding ratio M in accordance with a linear aliasing equation defined as:

$$f_{IF} = f_{IFu} + M \cdot f_s.$$

13. The method as claimed in claim 12, wherein:
more than one value of the folding-ratio M satisfies said linear aliasing equation,
the method further comprising one of:
a) setting the two lasers to a different intermediate frequency, $f_{IF,set}'$; and
b) sampling at a different known second sampling rate $f_s'$,
and repeating the step of sampling at least two of said differential electrical signals.

14. The method as claimed in claim 13, wherein said different intermediate frequency $f_{IF,set}'$ is approximately equal to $$(f_{IF,set} + 0.5 f_s)$$

and said different known second sampling rate $f_s'$, is approximately equal to $$f_{IF,set}/((f_{IF,set}/f_s) + 0.5).$$

15. The method as claimed in claim 11,
wherein the sampled signal comprises additional distinguishable tones in the frequency domain corresponding to harmonics of the intermediate frequency $f_{IF}$,
the method further comprising a harmonic-order identification procedure comprising:
sampling said differential electrical signal at a different known second sampling rate $f_s'$, the magnitude of the difference between said known primary and secondary sampling rates $f_s$, $f_s'$ being much smaller than the lesser of said frequencies, such that $|f_s' - f_s| \ll \min(f_s', f_s)$;
determining the harmonic order of each distinguishable tone from the relative shift of its respective aliased frequency corresponding to sampling at the known primary and secondary sampling rates $f_s$, $f_s'$.

16. The method as claimed in claim 15, wherein the amplitude of each of the additional sampled harmonic tones ($P_2$, $P_3$, ... $P_k$) identified with said harmonic-order identification procedure provides an indication of the power of each harmonic tone, the method further comprising the step of estimating total harmonic distortion (THD), said THD being related to a ratio of one of:
a direct sum of the power of each harmonic tone, and
a sum of the squares of the power of each harmonic tone,
with respect to an amplitude ($P_1$) corresponding to the sampled tone at intermediate frequency $f_{IF}$.

17. The method as claimed in claim 11, wherein said primary sampling rate $f_s$ is less than ten times the symbol rate $f_{BAUD}$ of the optical communication signal to be received by the ICR in normal use.

18. A test system for characterizing a parameter of an Integrated Coherent Receiver (ICR) being designed for normal use to receive a phase-modulated optical communication signal transmitted at a specified symbol rate $f_{BAUD}$, and comprising:
- two optical input ports,
- an optical hybrid arrangement for heterodyne mixing of signals to be received at the two optical input ports, at a pair of complementary optical outputs, and
- a pair of balanced photodetectors to detect light at corresponding said pair of complementary optical outputs, to provide a differential electrical signal at an electrical output, the system comprising:
- two optical output ports for connection respectively to said two optical input ports of said ICR;
- a first polarized highly-coherent optical source for providing a first test signal at optical frequency $v_1$ and a second polarized highly-coherent optical source for providing a test signal at optical frequency $v_2$, said first and second test signals respective optical frequencies mutually spaced by an intermediate frequency $f_{IF} = v_2 - v_1$;
- an optical switching arrangement for switching said first and second test signals into at least a first and a second test configuration wherein:
  - in said first test configuration, the first and the second test signals are directed to respective said two optical output ports such that the first test signal is to be injected into one of the two optical input ports of the ICR and the second test signal into the other of the two optical input ports; and
  - in said second test configuration, the first and the second test signals are combined and directed to a given one of the two optical output ports to be together injected in co-propagation into a corresponding one of the two optical input ports;
- an analog-to-digital converter for sampling the electrical output of the ICR at a known primary sampling rate $f_s$, the electrical output being responsive to heterodyne mixing of said first and second optical test signals, wherein:
  - sampling the electrical output in said first test configuration is to provide a denominator value, and
  - sampling the electrical output in said second test configuration is to provide a numerator value corresponding to said given one of the two optical input ports; and
- a signal processor configured for calculating a value of said parameter from the numerator value and the denominator value.

19. The test system as claimed in claim 18, wherein
- said two input ports of the ICR correspond to a signal input (SIG) port, normally used for receiving the phase-modulated communication signal, and a local oscillator (LO) input port, respectively; and
- said parameter comprises a Common Mode Rejection Ratio (CMRR) for said electrical output at said intermediate frequency $f_{IF}$, corresponding to injection of said co-propagating test signals into said given one of the signal (SIG) and local oscillator (LO) input ports, a value of the CMRR being proportional to a ratio of the numerator value with respect to the denominator value.

20. The test system as claimed in claim 19, wherein said optical switching arrangement is adapted to further switch said first and second test signals into at least a third test configuration wherein the first and the second test signals are combined and directed to the other of said given one of the two optical output ports to be together injected in co-propagation into the other of said specified one of the signal (SIG) and local oscillator (LO) input ports.

21. The test system as claimed in claim 18, wherein the ICR comprises a plurality of said pair of complementary optical output, a respective plurality of said pair of balanced detectors, and a respective plurality of said electrical output, and wherein the test system further comprises a plurality of said analog-to-digital converter for sampling said plurality of said electrical output in order to calculate corresponding values of said parameter.

22. The test system as claimed in claim 21, wherein
- said phase-modulated optical communication signal comprises two spectrally-superposed orthogonal polarization components (X,Y);
- said optical hybrid arrangement comprises two optical mixers, each mixer receiving a respective one of two orthogonally-decomposed polarization-analyzed portions of the first and second optical test signals injected into the optical input ports; and
- the plurality of said electrical output includes at least two of IX, QX, IY, QY.

23. The test system as claimed in claim 22, further comprising at least one polarization controller (PC) for adjusting the state of polarization (SOP) of the first test signal with respect to the optical input ports such that the two optical mixers simultaneously receive mutually-orthogonal analyzed portions thereof, these respective mutually-orthogonal analyzed portions being substantially of equal magnitude.

24. The test system as claimed in claim 22, wherein the CMRR for a plurality of combinations of input ports and electrical outputs can be measured.

25. The test system as claimed in claim 19, wherein either or both the first polarized highly-coherent optical source and the second polarized highly-coherent optical source is tunable in order to repeat the CMRR measurement at at least another value of intermediate frequency $f_{IF}$.

26. The test system as claimed in claim 18, wherein:
- said sampling rate fs of said analog-to-digital converter is less than two times the value of said intermediate frequency $f_{IF}$, such that detection of said electrical output of the ICR is undersampled detection, and
- $f_{IF}$ is known to fall within an interval defined by an uncertainty $\Delta f_{IF}$ associated with an approximately known intermediate-frequency set value $f_{IF,set}$ such that it satisfies $$f_{IF,set} - \Delta f_{IF} \leq f_{IF} \leq f_{IF,set} + \Delta f_{IF},$$

the uncertainty $\Delta f_{IF}$ being less than half the primary sampling rate fs;
- at least two of said electrical outputs are sampled at said primary sampling rate fs, said at least two electrical outputs corresponding to respective ones of an in-phase representation and a quadrature-phase (IX, QX; IY, QY) representation of the heterodyne-mixed coherent optical test light; and
- said signal processor comprises an IF determination function comprising the steps of:
  - identifying, in the frequency domain, an aliased tone corresponding to said intermediate frequency $f_{IF}$ at a corresponding aliased frequency $f_{IF,u}$; and
  - evaluating the value of said intermediate frequency $f_{IF}$ from parameters comprising the aliased frequency value $f_{IF,u}$, the intermediate-frequency set value $f_{IF,set}$, the uncertainty $\Delta f_{IF}$ and the known primary sampling rate fs.

27. The test system as claimed in claim 26, wherein said IF determination function is such that the evaluation of the value of intermediate frequency $f_{IF}$ comprises evaluating an integer representing a undersampling folding ratio M, said folding ratio M satisfying a folding ratio condition for which:

I. if
$$(f_{IF,set} + \Delta f) > \left[\text{ROUND}\left(\frac{f_{IF,set}}{f_s}\right) + 1/2\right] \cdot f_s,$$

and if $f_{IF,u} < (f_{IFu,set} - \Delta f)$, then
$$M = \text{ROUND}\left(\frac{f_{IF,set}}{f_s}\right) + 1;$$

otherwise:
II. if
$$f_{IF,set} + \Delta f < \left[\text{ROUND}\left(\frac{f_{IF,set}}{f_s}\right) + 1/2\right] \cdot f_s,$$

and if $f_{IF,u} > f_{IFu,set} + \Delta f$, then
$$M = \text{ROUND}\left(\frac{f_{IF,set}}{f_s}\right) - 1;$$

otherwise:
III.
$$M = \text{ROUND}\left(\frac{f_{IF,set}}{f_s}\right);$$

wherein
$$f_{IFu,set} = f_{IF,set} - f_s \cdot \text{ROUND}\left(\frac{f_{IF,set}}{f_s}\right),$$

said value of intermediate frequency $f_{IF}$ then being related to said aliased frequency value $f_{IF,u}$, said sampling rate $f_s$, and said undersampling folding ratio M in accordance with a linear aliasing equation defined as:

$$f_{IF} = f_{IFu} + M \cdot f_s.$$

28. The test system as claimed in claim 26, wherein said primary sampling rate $f_s$ of said analog-to-digital converter is less than ten times the symbol rate $f_{BAUD}$ of the optical communication signal to be received by the ICR in normal use.

* * * * *